United States Patent
Hanzawa et al.

(10) Patent No.: US 10,359,236 B2
(45) Date of Patent: Jul. 23, 2019

(54) HEAT STORAGE MATERIAL CONTAINER

(71) Applicant: NGK INSULATORS, LTD., Nagoya (JP)

(72) Inventors: Shigeru Hanzawa, Kakamigahara (JP); Kouji Ogura, Chiryuu (JP)

(73) Assignee: NGK Insulators, Ltd., Nagoya (JP)

( * ) Notice: Subject to any disclaimer, the term of this patent is extended or adjusted under 35 U.S.C. 154(b) by 296 days.

(21) Appl. No.: 15/178,947

(22) Filed: Jun. 10, 2016

(65) Prior Publication Data

US 2016/0282056 A1 Sep. 29, 2016

Related U.S. Application Data

(63) Continuation of application No. PCT/JP2015/078114, filed on Oct. 2, 2015.

(30) Foreign Application Priority Data

Nov. 10, 2014 (JP) ................. 2014-227754

(51) Int. Cl.
   *F28D 20/00* (2006.01)
   *F28F 23/00* (2006.01)
   *F28D 20/02* (2006.01)

(52) U.S. Cl.
   CPC ............ *F28D 20/00* (2013.01); *F28D 20/02* (2013.01); *F28D 20/023* (2013.01); *F28F 23/00* (2013.01);
   (Continued)

(58) Field of Classification Search
   CPC ..... F28D 2020/0008; F28D 2020/0017; F28D 20/003; F28D 20/00; F28D 20/0056;
   (Continued)

(56) References Cited

U.S. PATENT DOCUMENTS 4,402,915 A * 9/1983 Nishizaki .............. C01B 3/0005
   165/104.12
4,409,799 A * 10/1983 Nishizaki ................ F25B 17/12
   165/104.12
(Continued)

FOREIGN PATENT DOCUMENTS

DE 10 2005 018 307 A1 10/2006
DE 10 2008 040 451 A1 1/2010
(Continued)

OTHER PUBLICATIONS

International Search Report and Written Opinion (Application No. PCT/JP2015/078114) dated Dec. 8, 2015.
(Continued)

*Primary Examiner* — Devon Russell
(74) *Attorney, Agent, or Firm* — Burr & Brown, PLLC

(57) ABSTRACT

The "heat storage material storage container" comprises "a main body having a longitudinal direction and including a plurality of flow channels therein, the flow channels extending parallel to each other in the longitudinal direction and separated from each other by porous walls" and "a heat storage material contained in only one or some of the plurality of flow channels." The plurality of flow channels include "a plurality of first flow channels each having an open end on a first side in the longitudinal direction and a closed end on a second side in the longitudinal direction" and "a plurality of second flow channels each having open ends on both the first side and the second side in the longitudinal direction." The heat storage material is contained in only the first flow channels.

3 Claims, 24 Drawing Sheets

(52) U.S. Cl.
CPC ............... *F28D 2020/0004* (2013.01); *F28D 2020/0017* (2013.01); *Y02E 60/145* (2013.01)

(58) Field of Classification Search
CPC .......... F28D 20/025; F28D 2020/0013; F28D 2020/0021; F28D 2020/0004
See application file for complete search history.

(56) References Cited

U.S. PATENT DOCUMENTS

| | | | | |
|---|---|---|---|---|
| 4,422,500 | A * | 12/1983 | Nishizaki | F25B 17/12 165/104.12 |
| 4,928,496 | A * | 5/1990 | Wallace | C01B 3/0005 62/46.2 |
| 4,993,481 | A * | 2/1991 | Kamimoto | C04B 38/0006 126/643 |
| 5,440,899 | A * | 8/1995 | De Beijer | F28D 20/003 165/104.12 |
| 2004/0194908 | A1* | 10/2004 | Tomohide | F28D 20/021 165/10 |
| 2005/0253019 | A1* | 11/2005 | Hoehne | B64D 11/02 244/129.1 |
| 2006/0051638 | A1* | 3/2006 | Gross | C01B 3/0005 429/421 |
| 2006/0225863 | A1* | 10/2006 | Levin | F28D 20/021 165/10 |
| 2008/0261806 | A1* | 10/2008 | Konstandopoulos | B01D 53/944 502/303 |
| 2010/0252248 | A1* | 10/2010 | Shimazu | C04B 33/02 165/185 |
| 2011/0048388 | A1* | 3/2011 | Takahashi | B01J 23/63 123/568.11 |
| 2013/0056193 | A1* | 3/2013 | Thiers | C09K 5/063 165/185 |
| 2013/0075052 | A1* | 3/2013 | Hara | C09K 5/16 165/10 |
| 2013/0228306 | A1* | 9/2013 | O'Coin | B01D 53/0438 165/67 |

FOREIGN PATENT DOCUMENTS

| | | | |
|---|---|---|---|
| DE | 10 2010 004 358 A1 | 6/2011 | |
| EP | 2781871 A2 * | 9/2014 | ......... F28D 21/0015 |
| JP | 02-097895 A1 | 4/1990 | |
| JP | 11-264683 A1 | 9/1999 | |
| JP | 11264683 A * | 9/1999 | ............. F28D 20/02 |
| JP | 2008-025853 A1 | 2/2008 | |
| JP | 2009-221289 A1 | 10/2009 | |
| JP | 2010-269978 A1 | 12/2010 | |
| JP | 2011-037240 A1 | 2/2011 | |
| JP | 2011-038750 A1 | 2/2011 | |
| JP | 2011-052919 A1 | 3/2011 | |
| JP | 2011-056678 A | 3/2011 | |
| JP | 2011-058678 A1 | 3/2011 | |
| JP | 2013-124823 A1 | 6/2013 | |
| JP | 2013-195022 A1 | 9/2013 | |
| JP | 2013-234669 A1 | 11/2013 | |
| JP | 2013-253212 A1 | 12/2013 | |

OTHER PUBLICATIONS

Extended European Search Report (Application No. 15858204.9) dated Aug. 29, 2017.
English translation of International Preliminary Report on Patentability (Chapter I) (Application No. PCT/JP2015/078114) dated May 26, 2017, 8 pages.
Japanese Office Action (and English translation provided by foreign counsel) from a corresponding Japanese patent application (JP 2016-538151) dated Jun. 4, 2019.

* cited by examiner

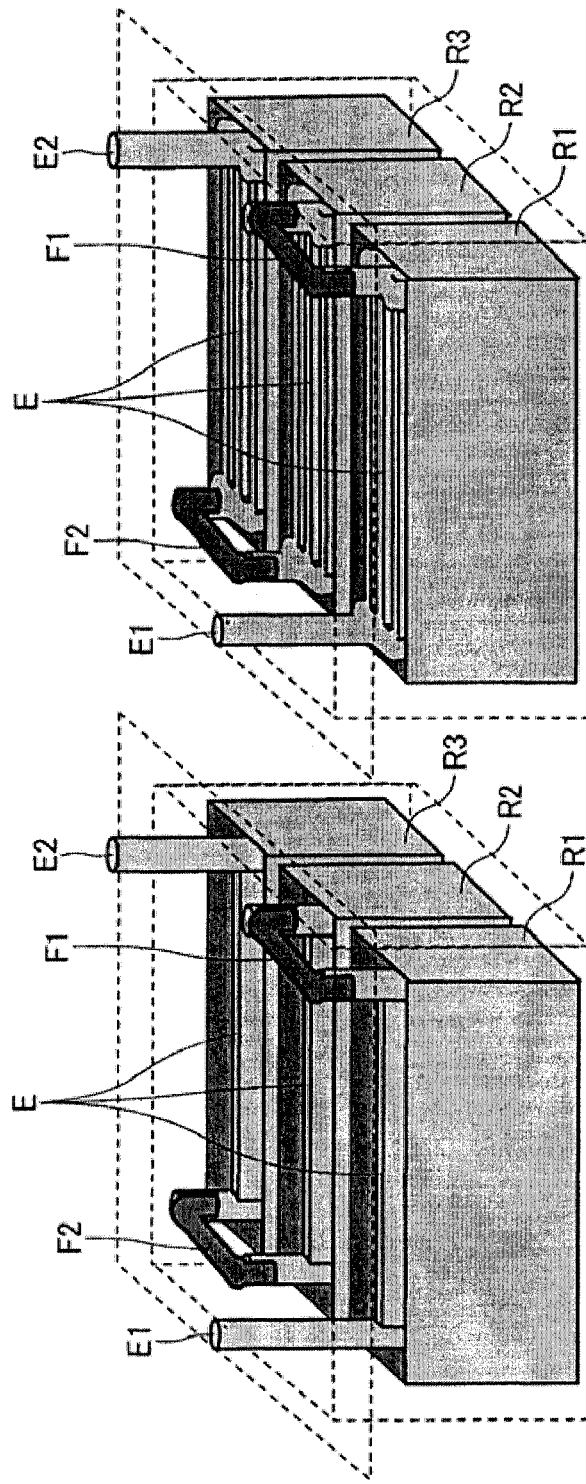

HEAT STORAGE MATERIAL CONTAINER

BACKGROUND OF THE INVENTION

1. Field of the Invention

The present invention relates to a container containing a heat storage material, adapted to be placed within a reactor of a chemical heat pump.

2. Description of the Related Art

From the viewpoint of efficient resource and energy use, there is a growing need to realize a technology for storing waste heat generated in a factory, or the like for a prolonged period and reusing the stored heat at any time. Chemical heat pumps (heat pumps using a chemical heat storage system) have been devised as one of the approaches for realizing this technology (see, for example, PTLs 1 and 2).

Each of the chemical heat pumps disclosed in the cited literature includes a "reaction section containing a heat storage material", a "condensing section containing water vapor and water and capable of enabling a phase transition between the water vapor and the water", a "connecting section connecting the reaction section and the condensing section", a "valve adapted to open or close the connecting section", and a "first fluid passage in which heat exchange is performed between a fluid flowing therein and the heat storage material". This "heat storage material" has: "a property of dissipating heat while being converted into a hydrate by an exothermic reaction with water vapor" (first property); and "a property of storing heat while releasing water vapor and thus being dehydrated by an endothermic reaction of the hydrate caused by receiving external heat" (second property).

In the heat storage mode of the chemical heat pump, a high-temperature gas is introduced into the first fluid passage in a state where the valve is open. When the high-temperature gas flowing in the first flow channel passes a position at which the heat exchange is performed, the hydrate of the heat storage material in the reaction section receives heat from the high-temperature gas. Thus, an endothermic reaction of the hydrate occurs according to the "second property", so that the hydrate dehydrates to be converted into the heat storage material itself (=dehydrated material), and the temperature of the heat storage material increases (that is, the heat storage material stores heat). Water vapor (gas) generated by the dehydration flows to the condensing section from the reaction section through the connecting section. The water vapor that has reached the condensing section is converted into water (liquid) by phase transition (condensation), and the water is stored in the condensing section. The high-temperature gas is deprived of heat by the endothermic reaction. Consequently, the temperature of the gas (exhaust gas) discharged from the first fluid passage is reduced. Thus, in the heat storage mode, some of the heat of a high-temperature gas is stored in the heat storage material (dehydrated material) by introducing the high-temperature gas into the first fluid passage in a state where the valve is open.

To hold the heat stored in the heat storage material (=dehydrated material), the valve is closed. Since water vapor generated from the water in the condensing section cannot flow to the reaction section when the valve is closed, an "exothermic reaction" does not occur between the "heat storage material in the reaction section" and the "water vapor". Hence, the heat storage material in the reaction section is kept in a "dehydrated material" state. Consequently, the heat stored in the heat storage material (=dehydrated material) can be held in the heat storage material over a desired period in which the valve is kept closed.

In the heat dissipation mode, a low-temperature gas (for example, a gas at room temperature) is introduced into the first fluid passage in a state where the valve is open. Since the valve is open, the water vapor generated by phase transition (evaporation) of the water in the condensing section flows to the reaction section from the condensing section. Consequently, an "exothermic reaction" occurs between the "heat storage material (=dehydrated material in the reaction section" and the "water vapor" according to the "first property", so that the heat storage material dissipates heat and is converted into a hydrate. When the low-temperature gas flowing in the first fluid flow channel passes a position at which the heat exchange is performed, the "low-temperature gas" receives the heat generated by the heat dissipation of the heat storage material. Consequently, the temperature of the gas discharged from the first fluid passage is increased. Thus, in the heat dissipation mode, a high-temperature gas can be taken out by introducing a low-temperature gas into the first fluid passage in a state where the valve is open. In other words, the heat stored in the heat storage material (=dehydrated material) can be reused.

A heat storage structure including a cell holding a heat storage material and sealed at both ends thereof with seal portions (see, for example, PTL 3) has also been devised. Even if the volume of the heat exchange material of this type is expanded, the heat storage structure does not have any space that can accept the expanded volume. Thus, the heat storage structure is likely to be broken by repetitive expansion and contraction.

CITATION LIST

Patent Literature

PTL 1: Japanese Unexamined Patent Application Publication No. 2008-025853

PTL 2: Japanese Unexamined Patent Application Publication No. 2013-195022

PTL 3: Japanese Unexamined Patent Application Publication No. 2013-124823

SUMMARY OF THE INVENTION

In the above-cited literature, the powder of the heat storage material is contained in the reactor of the reaction section. The reactor is filled with an aggregate of closely packed powder particles of the heat storage material. In the heat dissipation mode, water vapor entering the reaction section from the condensing section through the connecting section enters the reactor through the top of the reactor. Therefore the water vapor can easily reach the portion of the powder aggregate located at the upper side of the reactor. Consequently, an exothermic reaction is likely to occur in the portion of the powder located at the upper side of the reactor.

In order for water vapor to reach the portion of the powder aggregate located at the lower side of the reactor (portion near the bottom of the reactor), the water vapor must move to the lower side so as to penetrate spaces among particles of the closely packed powder in a meandering manner. Thus, water vapor cannot easily reach the region near the lower side of the reactor. Consequently, the exothermic reaction is unlikely to occur in the portion of the powder located at the lower side of the reactor.

If the reactor is filled with an aggregate of closely packed powder particles of a heat storage material, the aggregate is likely to have a portion in which an exothermic reaction does not easily occur, as described above. This implies that there is room for further increasing the exothermic reaction speed of the heat storage material as a whole (amount per unit time of the heat storage material that can react with water vapor).

In the heat storage mode, similarly, water vapor generated from the portion of the powder located at the upper side of the reactor by endothermic reaction easily flows to the connecting section through the top of the reactor. In order for water vapor generated from the portion of the powder located at the lower side of the reactor to flow to the upper side of the reactor, the water vapor must move to the upper side so as to penetrate spaces among particles of the closely packed powder in a meandering manner. Thus, the water vapor does not easily flow and is likely to be saturated accordingly. Consequently, the endothermic reaction is unlikely to occur in the portion of the powder located near the lower side of the reactor.

If the reactor is filled with an aggregate of closely packed powder particles of a heat storage material, the aggregate is likely to have a portion in which an endothermic reaction does not easily occur, as described above. This implies that there is room for further increasing the endothermic reaction speed of the heat storage material as a whole (amount per unit area of the heat storage material from which vapor is released).

If the exothermic reaction speed and the endothermic reaction speed are increased, the efficiency of heat exchange between the fluid flowing in the "first fluid passage" and the heat storage material is increased, and the energy efficiency of the chemical heat pump is increased as a whole, accordingly.

Accordingly, an object of the present invention is to provide a "heat storage material container" adapted to be placed within a reactor of a chemical heat pump for establishing a state where the aggregate of powder particles of the heat storage material contained in the reactor is unlikely to have a portion in which an exothermic reaction or endothermic reaction does not easily occur.

"A heat storage material container" according to the present invention comprises "a main body having a longitudinal direction and including a plurality of flow channels therein, the flow channels extending parallel to each other in the longitudinal direction and separated from each other by porous walls" and "a heat storage material contained in only one or some of the plurality of flow channels."

Preferably, the plurality of flow channels include "a plurality of first flow channels each having an open end on a first side in the longitudinal direction and a closed end on a second side in the longitudinal direction" and "a plurality of second flow channels each having open ends on both the first side and the second side in the longitudinal direction", and the heat storage material is contained only in the first flow channels without being contained in the second flow channels. The first flow channels and the second flow channels may be alternately arranged when viewed in the longitudinal direction.

"Heat storage material containers" having the above-described structure may be arranged in a reaction section in such a manner that the first side and the second side correspond to the upper side and the lower side in the vertical direction, respectively. In this arrangement, when water vapor is introduced into a reactor in a reaction section through the top of the reactor in the heat dissipation mode, the water vapor enters each container through the top of the container in the longitudinal direction. At this time, since the first flow channels are filled with the heat storage material, the water vapor does not easily flow into the first flow channels. Accordingly, a large portion of the water vapor enters the second flow channels not filled with the heat storage material.

The water vapor that has entered the second flow channels moves from the upper side to the lower side, thus flowing through the whole of the second flow channels from the upper side to the lower side. In this state, the water vapor in the second flow channels can flow to the first channels through pores in any portion in the vertical direction of the porous walls. Thus, the water vapor is able to reach the aggregate of powder particles of the heat storage material in the first flow channels substantially uniformly in the vertical direction. In other words, the aggregate is unlikely to have a portion which cannot easily be reached by the water vapor. This suggests that the aggregate is unlikely to have a portion in which the exothermic reaction does not easily occur.

Similarly, in the heat storage mode, the water vapor generated from the powder of the heat storage material in the first flow channels by the endothermic reaction can easily flow to the second flow channels through pores of the porous walls at any portion in the vertical direction. The water vapor that has entered the second flow channels easily exits through the upper ends of the second flow channels and flows to the connecting section through the top of the reactor. This suggests that the aggregate is unlikely to have a portion in which the endothermic reaction does not easily occur.

Thus, an arrangement of a plurality of "containers charged with the heat storage material" having the above-described structure in a reactor is expected to increase the reaction speeds of the exothermic reaction and the endothermic reaction. Accordingly, it is expected that the efficiency of heat exchange between the fluid flowing in the "first fluid passage" and the heat storage material will be increased, and that the energy efficiency of the chemical heat pump will be increased as a whole.

Preferably, the walls in the "heat storage material container" of the present invention are made of the same material as the "heat storage material contained in the container". Consequently, the amount of the heat storage material present in the reactor is increased, and accordingly the overall amount of reaction involved in the heat exchange in the chemical heat pump is increased compared to the case of using other materials.

The material of the walls is preferably SiC or C. SiC and C are materials having a relatively high thermal conductivity. Therefore, the thermal efficiency of the heat exchange between the fluid flowing in the "first fluid passage" and the heat storage material can be increased.

BRIEF DESCRIPTION OF THE DRAWINGS

FIGS. 15A and 15B are second representations illustrating the procedure for assembling the chemical heat pump shown in FIG. 13.

DETAILED DESCRIPTION OF THE INVENTION

First Embodiment

First, a first embodiment of the chemical heat pump according to the present invention will be described with reference to FIGS. 1 to 7.

<Structure>

Figure 1:
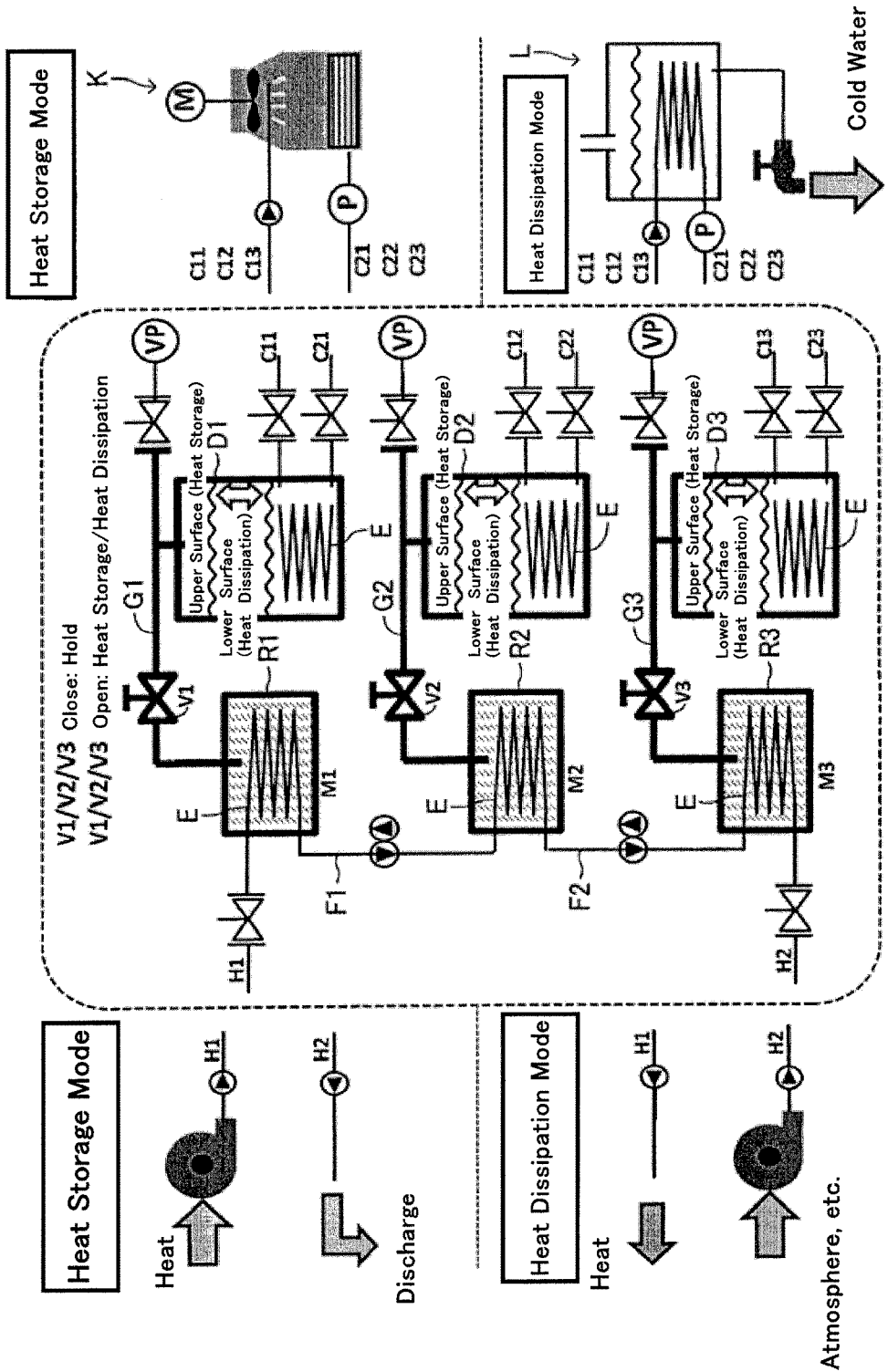
FIG. 1 is a schematic diagram of the entire system of a chemical heat pump according to a first embodiment of the present invention.

As shown in FIG. 1, in the first embodiment, the "reaction section" includes a first reactor R1, a second reactor R2, and a third reactor R3 that are independent of each other. The "condensing section" includes a first condenser D1, a second condenser D2, and a third condenser D3 that are independent of each other. The "connecting section" includes a "pipe G1 connecting R1 and D1", a "pipe G2 connecting R2 and D2", and a "pipe G3 connecting R3 and D3". "Valves" include a "valve V1 for opening and closing G1", a "valve V2 for opening and closing G2", and a "valve V3 for opening and closing G3". The sections indicated by bold lines in FIG. 1 are spaces that are controlled to a pressure lower than the atmospheric pressure at room temperature with corresponding vacuum pumps VP after the pump has been assembled (before operation) and are then sealed (the same applies to FIGS. 10, 12, and 18, which will be described later).

R1, R2, and R3 contain or are filled with the powder of a first heat storage material M1, the powder of a second heat storage material M2, and the powder of a third heat storage material M3, respectively. Hence, M1, M2, and M3 are disposed at different positions in the "reaction section". Each of M1, M2, and M3 has: "a property of dissipating heat while being converted into a hydrate by an exothermic reaction with water vapor" (first property); and "a property of storing heat while releasing water vapor and thus being dehydrated by an endothermic reaction of the hydrate caused by receiving external heat" (second property).

The heat storage material has a conversion temperature corresponding to the critical point at which the "heat storage material itself (=dehydrated material)" and the "hydrate of the heat storage material" are converted into each other. The conversion temperature of a heat storage material depends on the material and also varies depending on the ambient pressure around the heat storage material.

M1, M2, and M3 are typically CaO, MgO, and $CaSO_4$, respectively. CaO, MgO, and $CaSO_4$ are involved in the reactions expressed by the following formulas (1), (2), and (3), respectively. In the formulas, "Q" represents thermal energy. In formulas (1), $Ca(OH)_2$ is a hydrate of CaO. In formulas (2), $Mg(OH)_2$ is a hydrate of MgO. In formulas (3), $CaSO_4 \cdot 1/2H_2O$ is a hydrate of $CaSO_4$.

$Ca(OH)_2 + Q \rightarrow CaO + H_2O$ (Endothermic reaction)

$Ca(OH)_2 + Q \leftarrow CaO + H_2O$ (Exothermic reaction)  (1)

$Mg(OH)_2 + Q \rightarrow MgO + H_2O$ (Endothermic reaction)

$Mg(OH)_2 + Q \leftarrow MgO + H_2O$ (Exothermic reaction)  (2)

$2 \cdot (CaSO_4 \cdot 1/2H_2O) + Q \rightarrow 2CaSO_4 + H_2O$ (Endothermic reaction)

$2 \cdot (CaSO_4 \cdot 1/2H_2O) + Q \leftarrow 2CaSO_4 + H_2O$ (Exothermic reaction)  (3)

Figure 8:
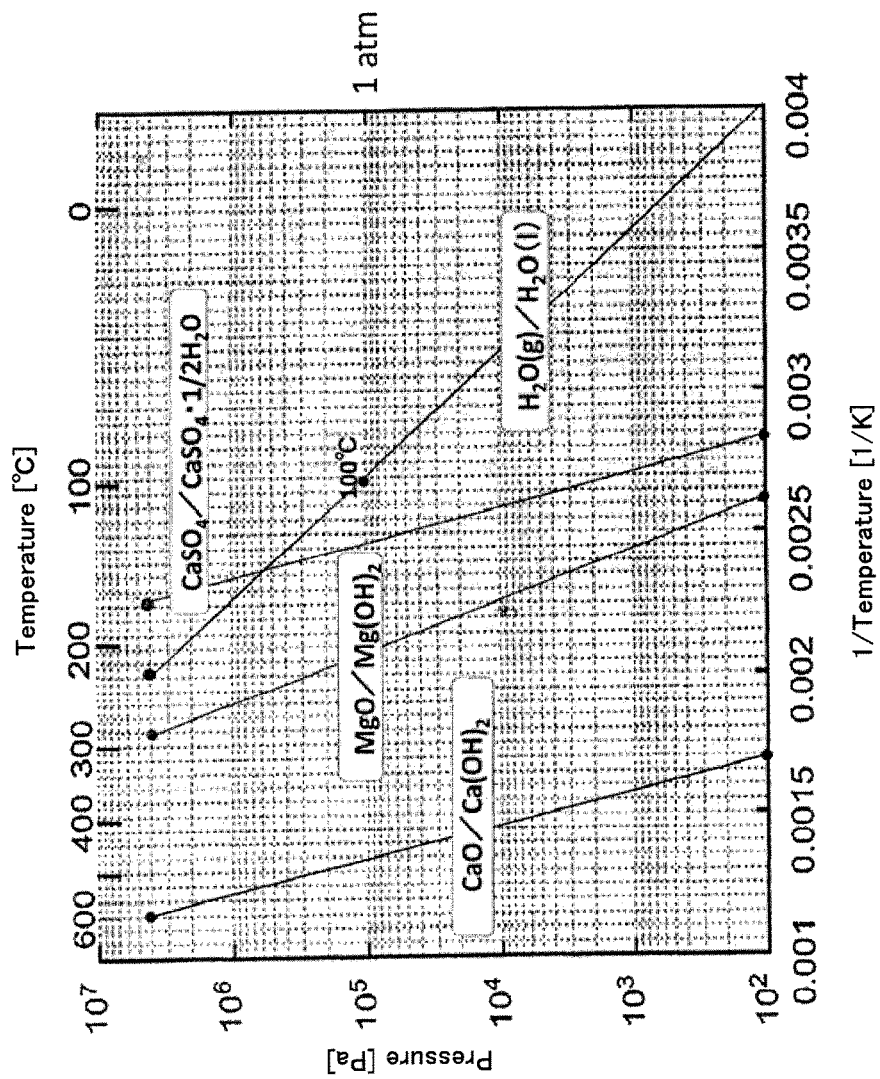
FIG. 8 is a graph (thermal equilibrium diagram) showing the relationships each between the conversion temperature of one of a plurality of heat storage materials and the ambient pressure.
Figure 9:
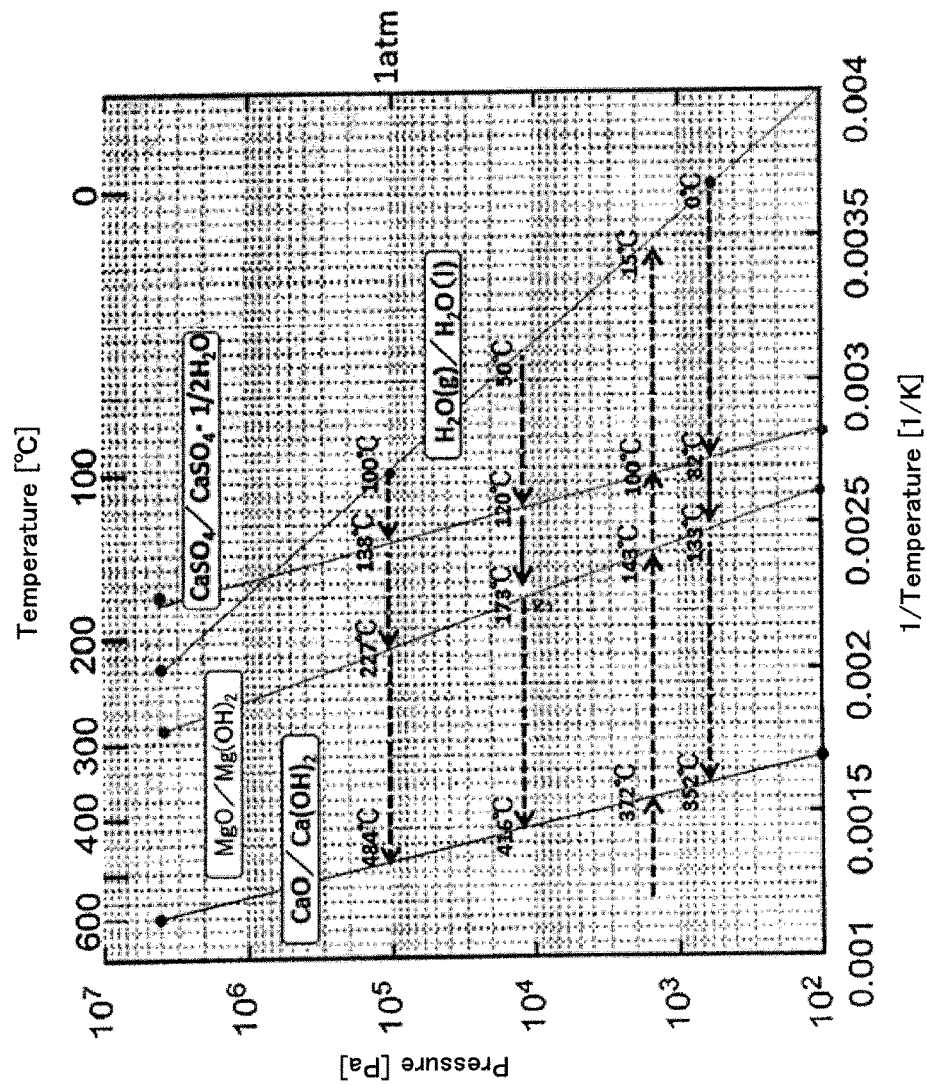
FIG. 9 is a graph showing the conversion temperatures of heat storage materials at representative pressures in the thermal equilibrium diagram shown in FIG. 8.

As can be understood from the thermal equilibrium diagrams of FIGS. 8 and 9 showing relationships between the conversion temperature of each heat storage material and the ambient pressure, the conversion temperature of CaO (=M1) is higher than the conversion temperature of MgO (=M2) and the conversion temperature of MgO (=M2) is higher than the conversion temperature of $CaSO_4$ (=M3) (at the same ambient pressure).

R1, R2, and R3 each contain a heat exchanger E including a meandering flow channel. The heat exchanger E in R1 is surrounded by the aggregate of powder particles of M1 contained in R1. The heat exchanger E in R2 is surrounded by the aggregate of powder particles of M2 contained in R2. The heat exchanger E in R3 is surrounded by the aggregate of powder particles of M3 contained in R3. Thus, heat exchange can occur "between the fluid flowing in the heat exchanger E in R1 and the powder of M1 contained in R1", "between the fluid flowing in the heat exchanger E in R2 and the powder of M2 contained in R2", and "between the fluid flowing in the heat exchanger E in R3 and the powder of M3 contained in R3".

The first side of the heat exchanger E in R1 is connected to an opening H1 of a pipe, and a second side of the heat exchanger E in R1 is connected to the first side of the heat exchanger E in R2 with a pipe F1 therebetween. The second side of the heat exchanger E in R2 is connected to the first side of the heat exchanger E in R3 with a pipe F2 therebetween, and the second side of the heat exchanger E in R3 is connected to an opening H2 of a pipe. In this structure, the "first fluid passage" is a continuous flow channel formed by connecting the member defining the opening H1, the heat exchanger E in R1, the pipe F1, the heat exchanger E in R2, the pipe F2, the heat exchanger E in R3, and the member defining the opening H2 in this order. The "first side" of the "first fluid flow channel" corresponds to the opening H1, and the "second side" of the "first fluid flow channel" corresponds to the opening H2.

Hence, in the first embodiment, the position (within R2) where the fluid flowing in the "first fluid passage" performs heat exchange with M2 (=MgO) is located to the first side of the position (within R3) where the fluid performs heat exchange with M3 (=CaSO$_4$), and the position (within R1) where the fluid performs heat exchange with M1 (=CaO) is located to the first side of the position (within R2) where the fluid performs heat exchange with M2 (=MgO). In other words, the first embodiment is configured so that the fluid flowing in the "first fluid passage" can perform heat exchanges with heat storage materials in such a manner that the higher the conversion temperature of the heat storage material, the closer the heat exchange position to the first side of the "first fluid flow channel".

D1, D2, and D3 each contain water (or water vapor). Also, D1, D2, and D3 each contain the above-described heat exchanger E. The heat exchangers E in D1, D2, and D3 are immersed in water contained in D1, D2, and D3, respectively. Thus, heat exchange can be performed "between the fluid flowing in the heat exchanger E in D1 and water contained in D1", "between the fluid flowing in the heat exchanger E in D2 and water contained in D2", and "between the fluid flowing in the heat exchanger E in D3 and water contained in D3".

The first side of the heat exchanger E in D1 is connected to an open end C11 of a pipe, and the second side of the heat exchanger E in D1 is connected to an open end C21 of a pipe. The first side of the heat exchanger E in D2 is connected to an open end C12 of a pipe, and the second side of the heat exchanger E in D2 is connected to an open end C22 of a pipe. The first side of the heat exchanger E in D3 is connected to an open end C13 of a pipe, and the second side of the heat exchanger E in D3 is connected to an open end C23 of a pipe. In this structure, a "second fluid passage" corresponds to a "continuous flow channel formed by connecting the open end C11, the heat exchanger E in D1, and the open end C21 in this order", a "continuous flow channel formed by connecting the open end C12, the heat exchanger E in D2, and the open end C22 in this order", and a "continuous flow channel formed by connecting the open end C13, the heat exchanger E in D3, and the open end C23 in this order".

Figure 2:
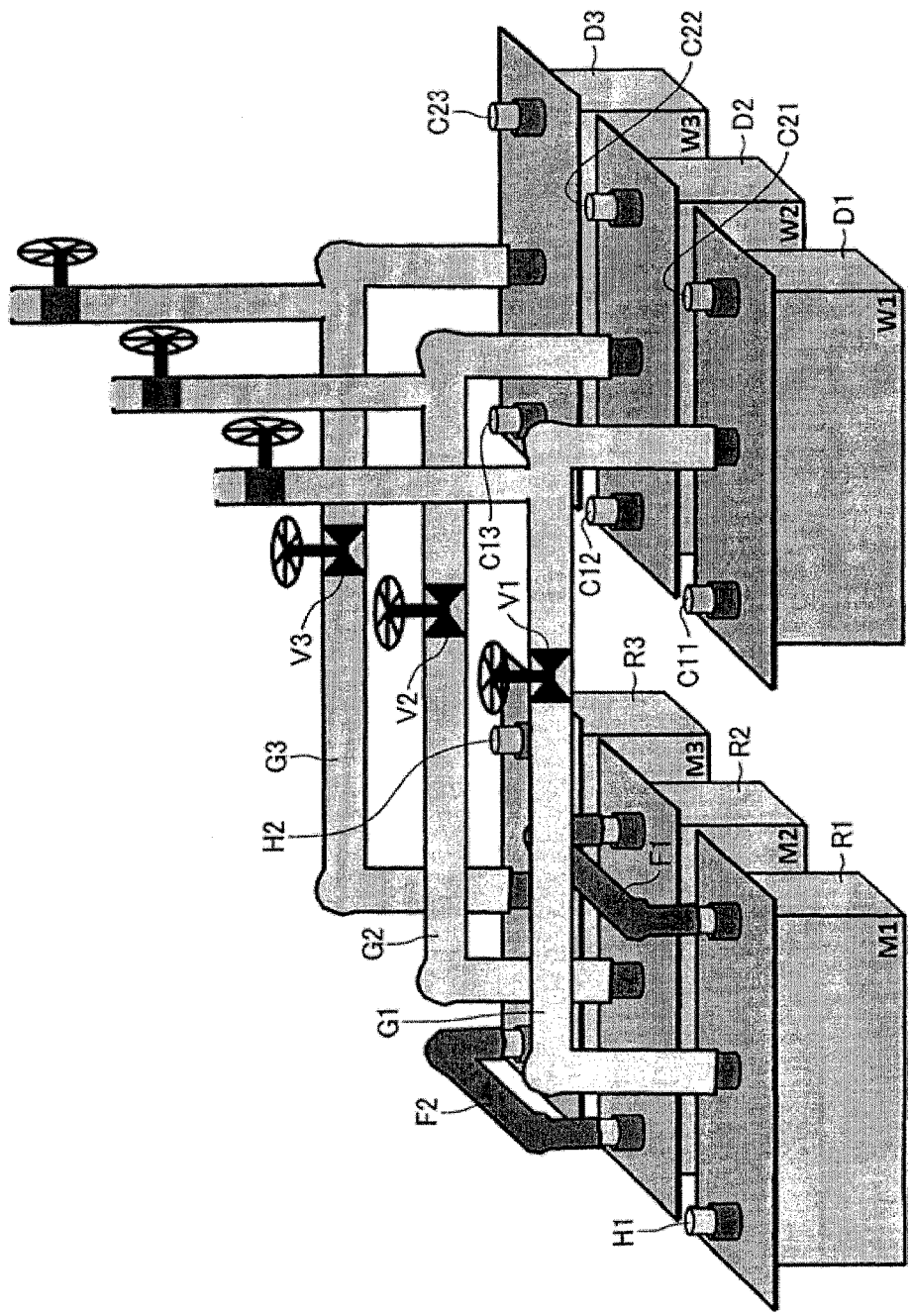
FIG. 2 is a schematic view of the entire structure of the chemical heat pump shown in FIG. 1.
Figure 3:
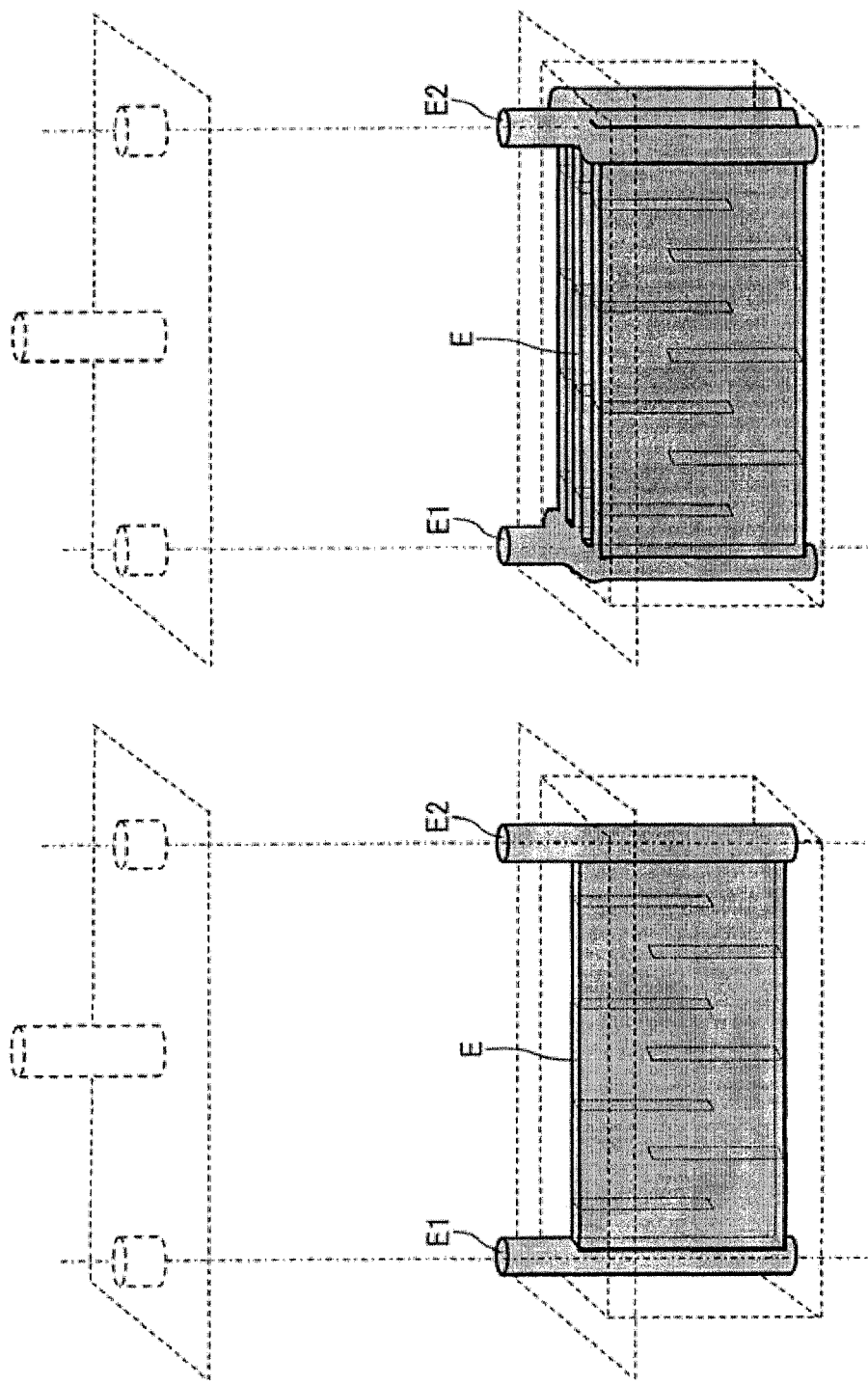
FIGS. 3A and 3B are first representations illustrating a procedure for assembling the chemical heat pump shown in FIG. 2.
Figure 4:
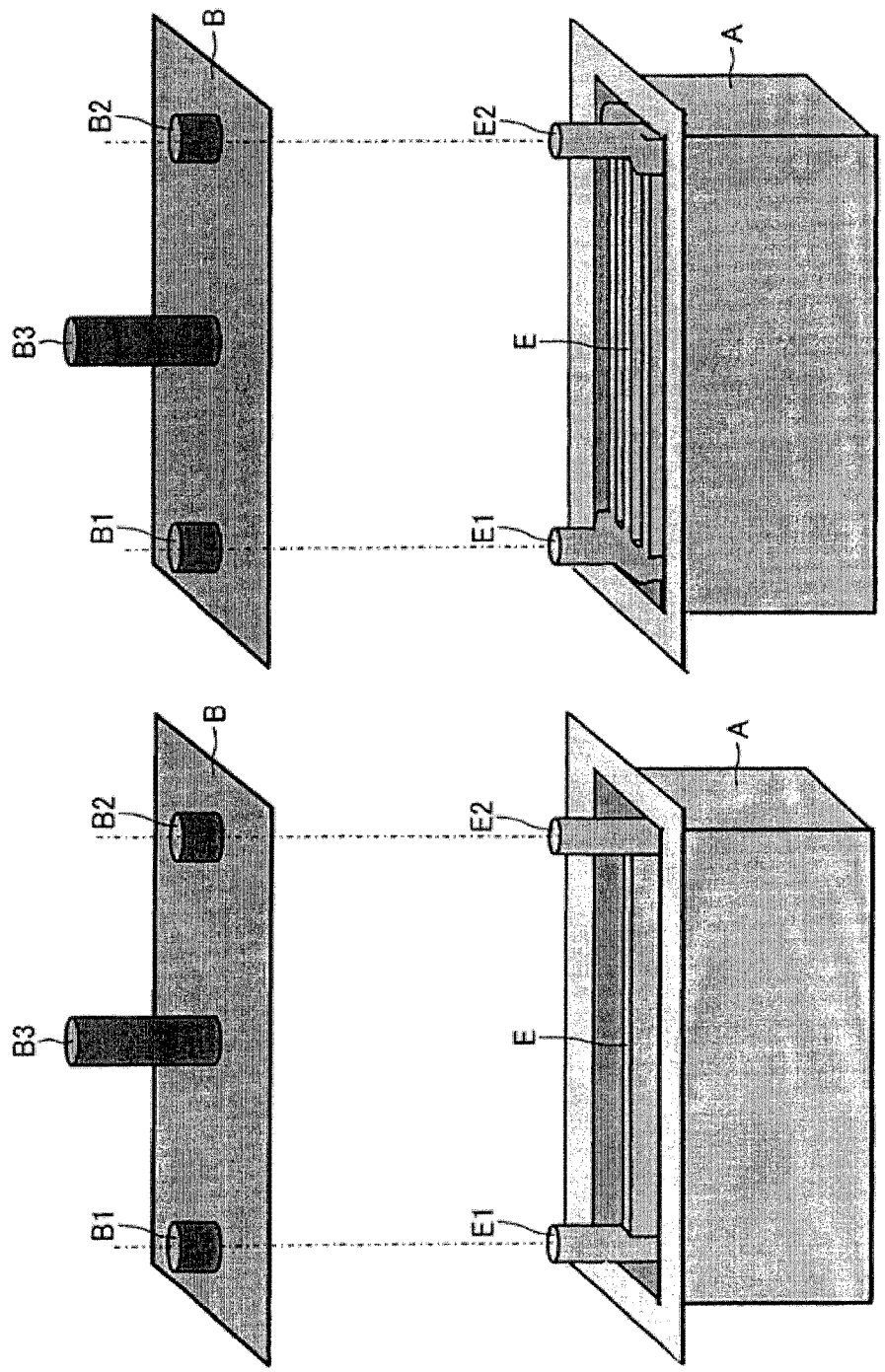
FIGS. 4A and 4B are second representations illustrating the procedure for assembling the chemical heat pump shown in FIG. 2.

FIG. 2 illustrates an exemplary structure of the first embodiment shown in its entirety in FIG. 1. The structure shown in FIG. 2 is assembled in accordance with the following procedure. First, heat exchangers E are prepared as shown in FIGS. 3A and 3B. Each heat exchanger E has an opening E1 to be in communication with the first side of a "meandering flow channel" formed within a plate portion of the heat exchanger and an opening E2 to be in communication with the second side of the flow channel. FIG. 3A shows an example of a heat exchanger E including a single plate portion, and FIG. 3B shows an example of a heat exchanger E including three plate portions.

Subsequently, the heat exchanger E is placed in the internal space of a substrate A whose top is open, in such a manner that the openings E1 and E2 protrude upward, as shown in FIGS. 4A and 4B. FIGS. 4A and 4B show a state where the heat exchanger E shown in FIG. 3A is contained and a state where the heat exchanger shown in FIG. 3B is contained, respectively.

Figure 5:
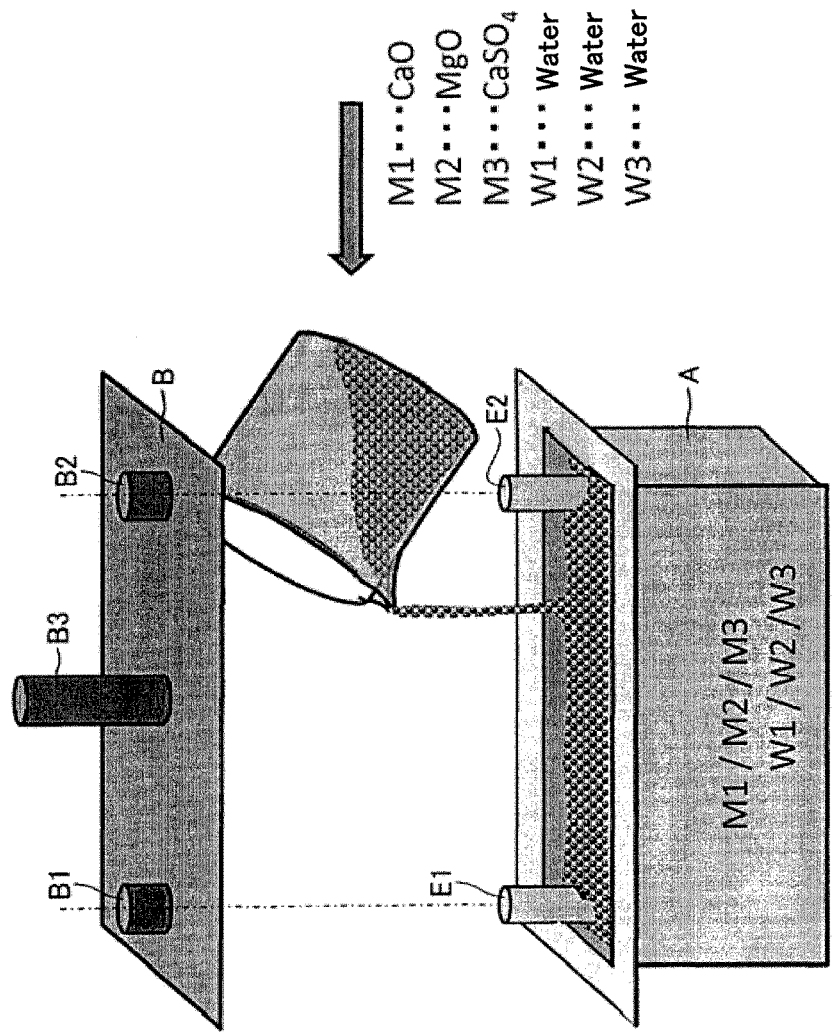
FIG. 5 is a third representation illustrating the procedure for assembling the chemical heat pump shown in FIG. 2.
Figure 6:
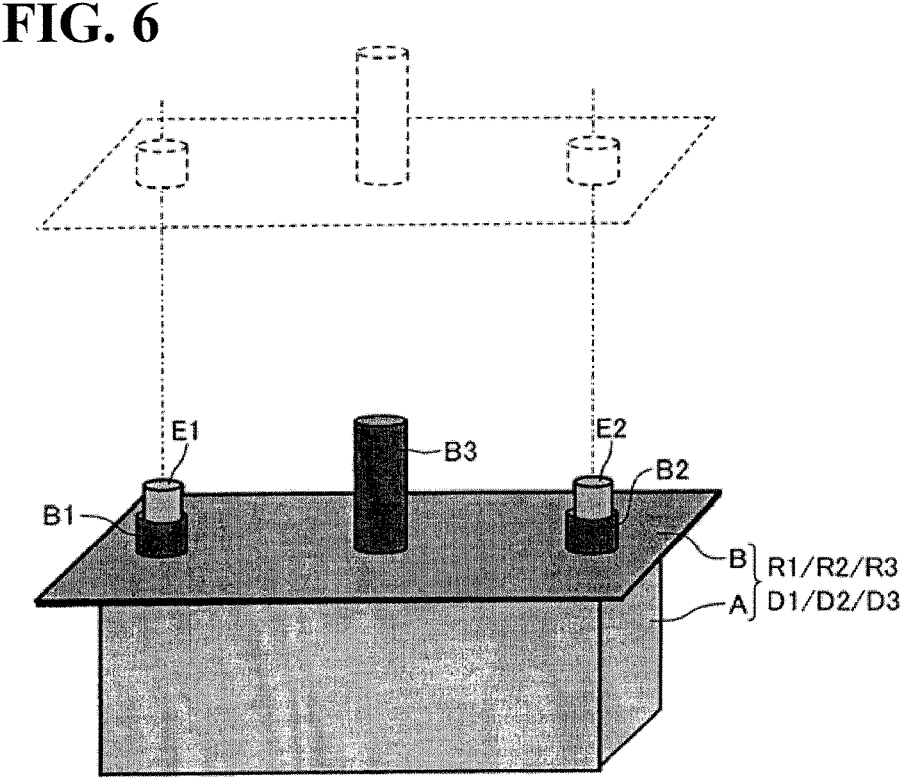
FIG. 6 is a fourth representation illustrating the procedure for assembling the chemical heat pump shown in FIG. 2.

Subsequently, the internal space of the substrate A containing the heat exchanger E is filled with any one of the powders of heat storage materials (M1, M2, and M3) or water (W1, W2, or S3), as shown in FIG. 5. Thus, the heat exchanger E is surrounded by the aggregate of powder particles of the heat storage material or immersed in water. Then, a lid B is joined to the top of the substrate A so as to seal the open top of the substrate in an air tight manner, as shown in FIG. 6. In this state, the openings E1 and E2 are exposed in hole portions B1 and B2, respectively formed on the lid B. A pipe B3 protruding upward from the lid B communicates with the internal space of the substrate A.

For the joined body shown in FIG. 6 of the substrate A and the lid B, the joined body containing the first heat storage material M1, the joined body containing the second heat storage material M2, and the joined body containing the third heat storage material M3 act as the first reactor R1, the second reactor R2, and the third reactor R3, respectively. Similarly, the joined bodies each containing water (W1, W2, or W3) act as the first condenser D1, the second condenser D2, and the third condenser D3, respectively.

Figure 7:
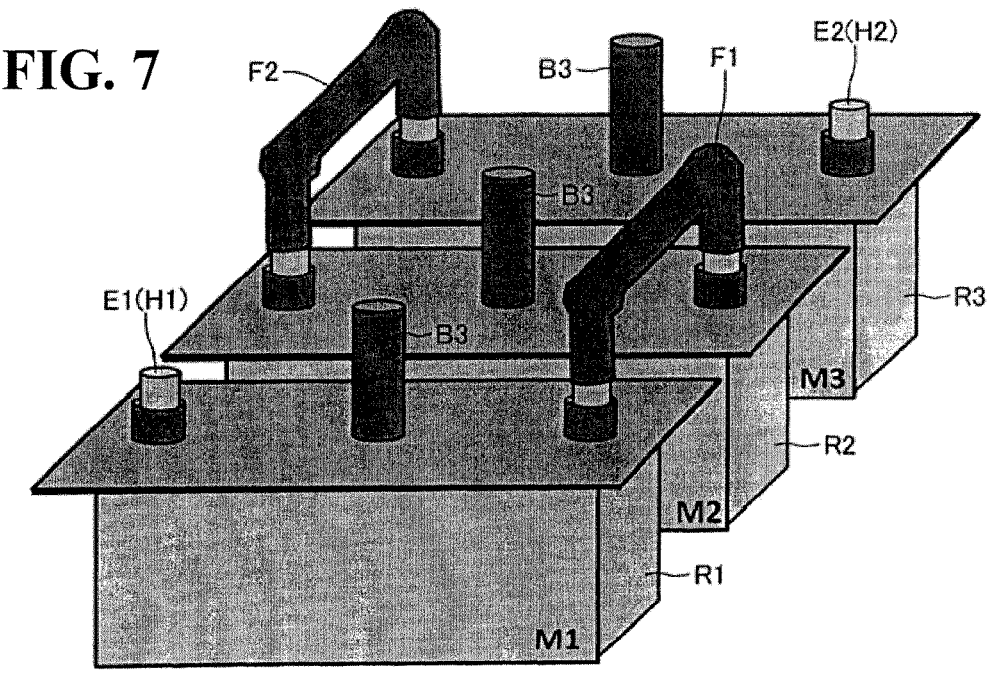
FIG. 7 is a fifth representation illustrating the procedure for assembling the chemical heat pump shown in FIG. 2.

Subsequently, the opening E2 exposed at the top of R1 and the opening E2 exposed at the top of R2 are connected in an air tight manner with a pipe F1 therebetween, and the opening E1 exposed at the top of R2 and the opening E1 exposed at the top of R3 are connected in an air tight manner with a pipe F2 therebetween, as shown in FIG. 7.

Then, the pipe B3 protruding upward from the top of R1 and the pipe B3 protruding upward from the top of D1 are connected in an air tight manner with a pipe G1 therebetween, the pipe B3 protruding upward from the top of R2 and the pipe B3 protruding upward from the top of D2 are connected with a pipe G2 therebetween, and the pipe B3 protruding from the top of R3 and the pipe B3 protruding from the top of D3 are connected in an air tight manner with a pipe G3 therebetween, as shown in FIG. 2. Valves V1, V2, and V3 are provided in G1, G2, and G3, respectively. V1, V2, and V3 are configured to open and close G1, G2, and G3, respectively.

As shown in FIG. 2, the opening E1 exposed at the top of R1 corresponds to the opening H1, and the opening E2 exposed at the top of R3 corresponds to the opening H2. Also, the openings E1 and E2 exposed at the top of D1 correspond to the open ends C11 and C21, respectively, the openings E1 and E2 exposed at the top of D2 correspond to the open ends C12 and C22, respectively, and the openings E1 and E2 exposed at the top of D3 correspond to the open ends C13 and C23, respectively.

<Operation>

Operation of the first embodiment will now be described with reference to FIGS. 1, 8, and 9. The description covers the operation in the heat storage mode (for storing some of the heat of a high-temperature gas in the heat storage material), the operation in the hold mode (for holding the heat stored in the heat storage material), and the operation in the heat dissipation mode (for reusing the heat stored in the heat storage material) in this order.

[Heat Storage Mode]

In the heat storage mode, a high-temperature gas (for example, exhaust gas from a factory) is introduced into the "first fluid passage" through the opening H1 of the "first fluid passage" and transferred to the opening H2 of the "first fluid passage" in a state where valves V1, V2, and V3 are open by using a pump or the like, as shown in FIG. 1. The high-temperature gas introduced through the opening H2 passes through the heat exchanger E in R1, the heat exchanger E in R2, and the heat exchanger E in R3, in this order, and is then discharged through the opening H2.

When the high-temperature gas flowing in the "first fluid passage" passes through the heat exchanger E in R1, the hydrate (=$Ca(OH)_2$) of the first heat storage material M1 (=CaO) in R1 receives heat from the high-temperature gas. Consequently, the "endothermic reaction" of the $Ca(OH)_2$ (see formulas (1)) occurs according to the above-described "second property". Thus, the $Ca(OH)_2$ is dehydrated into CaO itself (=dehydrated material), and the temperature of the CaO increases (that is, the CaO stores heat). This "endothermic reaction" occurs only when the temperature of the gas passing through the heat exchanger E in R1 is higher than or equal to the conversion temperature of CaO. This "endothermic reaction" continues until the $Ca(OH)_2$ in R1 is completely lost.

Water vapor (gas) generated by the dehydration flows from R1 to D1 through pipe G1. The water vapor that has reached D1 is converted into water (liquid) by phase transition (condensation), and the water is stored in D1. The high-temperature gas passing through the heat exchanger E in R1 is deprived of heat by the "endothermic reaction" (see formulas (1)). The temperature of the high-temperature gas that has passed through the heat exchanger E in R1 is thus reduced from the temperature before passing through the heat exchanger E.

When the high-temperature gas that has passed through the heat exchanger E in R1 passes through the heat exchanger E in R2, the hydrate (=$Mg(OH)_2$) of the second heat storage material M2 (=MgO) in R2 receives heat from the high-temperature gas. Consequently, the "endothermic reaction" of the $Mg(OH)_2$ (see formulas (2)) occurs according to the above-described "second property". Thus, the $Mg(OH)_2$ is dehydrated into MgO itself (=dehydrated material), and the temperature of the MgO increases (that is, the MgO stores heat). This "endothermic reaction" occurs only when the temperature of the gas passing through the heat exchanger E in R2 is higher than or equal to the conversion temperature of MgO. This "endothermic reaction" continues until the $Mg(OH)_2$ in R2 is completely lost.

Water vapor (gas) generated by the dehydration flows from R2 to D2 through pipe G2. The water vapor that has reached D2 is converted into water (liquid) by phase transition (condensation), and the water is stored in D2. The high-temperature gas passing through the heat exchanger E in R2 is deprived of heat by the "endothermic reaction" (see formulas (2)). The temperature of the high-temperature gas that has passed through the heat exchanger E in R2 is thus reduced from the temperature before passing through the heat exchanger E.

When the high-temperature gas that has passed through the heat exchanger E in R2 passes through the heat exchanger E in R3, the hydrate (=$CaSO_4 \cdot 1/2H_2O$) of the third heat storage material M3 (=$CaSO_4$) in R3 receives heat from the high-temperature gas. Consequently, the "endothermic reaction" of the $CaSO_4 \cdot 1/2H_2O$ (see formulas (3)) occurs according to the above-described "second property". Thus, the $CaSO_4 \cdot 1/2H_2O$ is dehydrated into $CaSO_4$ itself (=dehydrated material), and the temperature of the $CaSO_4$ increases (that is, the $CaSO_4$ stores heat). This "endothermic reaction" occurs only when the temperature of the gas passing through the heat exchanger E in R3 is higher than or equal to the conversion temperature of $CaSO_4$. This "endothermic reaction" continues until the $CaSO_4 \cdot 1/2H_2O$ in R3 is completely lost.

Water vapor (gas) generated by the dehydration flows from R3 to D3 through pipe G3. The water vapor that has reached D3 is converted into water (liquid) by phase transition (condensation), and the water is stored in D3. The high-temperature gas passing through the heat exchanger E in R3 is deprived of heat by the "endothermic reaction" (see formulas (3)). The temperature of the high-temperature gas that has passed through the heat exchanger E in R3 is thus reduced from the temperature before passing through the heat exchanger E.

In the heat storage mode, when "the state where the temperature of the gas passing through each of the heat exchangers E in R1, R2, and R3 is higher than the conversion temperature of the corresponding heat storage material" is established by introducing a high-temperature gas to the "first fluid passage" through the opening H1 in a state where valves V1, V2, and V3 are open, heat can be stored in all the heat storage materials M1, M2, and M3. Consequently, the overall amount of heat stored in the heat storage materials of a chemical heat pump can be increased.

In order to stably establish and maintain the above-mentioned state in the heat storage mode, each of the conversion temperatures of the heat storage materials M1, M2, and M3, which vary depending on the ambient pressure, must be controlled (for example, so as to be kept constant). More specifically, in the heat storage mode, water in the condensers D1, D2, and D3 receives condensation heat generated by phase transition (condensation) of water from vapor. Therefore the temperatures of water in D1, D2, and D3 rise unless controlled. If the temperatures of water in D1, D2, and D3 rise, the vapor pressure of water increases, and the ambient pressures around the heat storage materials M1, M2, and M3 in the reactors R1, R2, and R3 increase accordingly. If the ambient pressures increase, the conversion temperatures of M1, M2, and M3 each increase.

In the first embodiment, in order to control each of the conversion temperatures of the heat storage materials M1, M2, and M3 (for example, so as to be kept constant) in the heat storage mode, D1, D2, and D3 are each provided with the above-described "second fluid passage". In order to control the temperatures of water in D1, D2, and D3 (for example, so as to be kept constant), a fluid (such as water) is run through the "second fluid passages".

More specifically, in the heat storage mode, the "second fluid passages" are connected to a cooling device K, as shown in FIG. 2. In the cooling device K, a warmed fluid coming from the first side (C11, C12, C13) of each "second fluid passage" is cooled with a motor-driven fan, and the cooled fluid is introduced to the corresponding "second fluid passage" through the second side (C21, C22, C23) thereof with a pump. Thus, the water in each of D1, D2, and D3 is cooled by heat exchange with the fluid flowing in the corresponding "second fluid passage". Thus, the temperatures of water in D1, D2, and D3 are controlled (for example, so as to be kept constant).

In the heat storage mode, when the ambient pressures in R1, R2, and R3 are controlled to a predetermined pressure, for example, less than 1 atm by controlling the temperatures of water in D1, D2, and D3, the conversion temperatures of M1, M2, and M3 are kept at, for example, 372° C., 143° C., and 100° C., respectively, as shown in FIG. 9. In this instance, when "a state is established where the gas flowing in the first fluid passage from H1 to H2 has temperatures higher than 372° C., 143° C., and 100° C. in the heat exchangers E in R1, R2, and R3, respectively", heat can be stored in all the heat storage materials M1, M2, and M3.

If a gas having a relatively low temperature is introduced from the opening H1, the temperatures of the gas in the heat exchangers E in R1 and R2 can be lower than the conversion temperatures of M1 and M2. Even in such a case, the temperature of the gas in the heat exchanger E in R3 can be higher than the conversion temperature of M3, which has a relatively low conversion temperature. Thus, even if a gas having a relatively low temperature is introduced from the opening H1, heat can be stored in at least one heat storage material having a relatively low conversion temperature.

[Hold Mode]

For holding the heat thus stored in the heat storage materials M1, M2, and M3, valves V1, V2, and V3 are closed. Thus, water vapor generated from the water in the condensers D1, D2, and D3 is prevented from flowing to the reactors R1, R2, and R3. Hence, "exothermic reactions" of M1, M2, and M3 (see formulas (1) to (3)) do not occur. Thus, the heat storage materials M1, M2, and M3 in R1, R2, and R3 are kept in a state of "dehydrated material". Consequently, the heat stored in the heat storage materials M1, M2, and M3 (=dehydrated materials) can be held in the heat storage materials themselves over a desired period in which the valves V1, V2, and V3 are kept closed.

[Heat Dissipation Mode]

In the heat dissipation mode, a low-temperature gas (for example, room-temperature gas) is introduced into the "first fluid passage" through the opening H2 of the "first fluid passage" and transferred to the opening H1 of the "first fluid passage" in a state where valves V1, V2, and V3 are open, by using a pump or the like, as shown in FIG. 1. The low-temperature gas introduced through the opening H2 passes through the heat exchanger E in R3, the heat exchanger E in R2, and the heat exchanger E in R1, in this order, and is then discharged through the opening H1.

Since the valves V1, V2, and V3 are open, the water vapor generated by phase transitions (evaporation) of the water in D1, D2, and D3 flows to R1, R2, and R3 from D1, D2, and D3, respectively. Consequently, "exothermic reactions" occurs between the water vapor" and each of the heat storage materials M1 (=CaO) in R1, M2 (=MgO) in R2, and M3 (=CaSO$_4$) in R3 (see formulas (1) to (3)) according to the above-described "first property", and the CaO, the MgO, and the CaSO$_4$ are converted into hydrates Ca(OH)$_2$, Mg(OH)$_2$, and CaSO$_4$.1/2H$_2$O, respectively, while releasing heat.

When the low-temperature gas flowing in the "first fluid passage" passes through the heat exchanger E in R3, the low-temperature gas receives heat generated by "heat dissipation" accompanied by the "exothermic reaction of CaSO$_4$". Consequently, the temperature of the gas that has passed through the heat exchanger E in R3 is raised from the temperature before passing through the heat exchanger E. This "exothermic reaction" occurs only when the temperature of the gas passing through the heat exchanger E in R3 is lower than the conversion temperature of CaSO$_4$. In other words, the temperature of the gas passing through the heat exchanger E in R3 may not be raised to a temperature higher than or equal to the conversion temperature of CaSO$_4$. This "exothermic reaction" continues until the CaSO$_4$ in R3 is completely lost, or until water in D3 is completely lost.

When the gas that has passed through the heat exchanger E in R3 passes through the heat exchanger E in R2, the gas receives the heat generated by "heat dissipation" accompanied by the "exothermic reaction of MgO". Consequently, the temperature of the gas that has passed through the heat exchanger E in R2 is raised from the temperature before passing through the heat exchanger. This "exothermic reaction" occurs only when the temperature of the gas passing through the heat exchanger E in R2 is lower than the conversion temperature of MgO. In other words, the temperature of the gas passing through the heat exchanger E in R2 may not be raised to a temperature higher than or equal to the conversion temperature of MgO. This "exothermic reaction" continues until the MgO in R2 is completely lost, or until water in D2 is completely lost.

When the gas that has passed through the heat exchanger E in R2 passes through the heat exchanger E in R1, the gas receives the heat generated by "heat dissipation" accompanied by the "exothermic reaction of CaO". Consequently, the temperature of the gas that has passed through the heat exchanger E in R1 is raised from the temperature before passing through the heat exchanger. This "exothermic reaction" occurs only when the temperature of the gas passing through the heat exchanger E in R1 is lower than the conversion temperature of CaO. In other words, the temperature of the gas passing through the heat exchanger E in R1 may not be raised to a temperature higher than or equal to the conversion temperature of CaO. This "exothermic reaction" continues until the CaO in R1 is completely lost, or until water in D1 is completely lost.

In the heat dissipation mode, when "the state where the temperature of the gas passing through each of the heat exchangers E in R3, R2, and R1 is lower than the conversion temperature of the corresponding heat storage material" is established by introducing a low-temperature gas into the "first fluid passage" through the opening H2 in a state where valves V1, V2, and V3 are open, heat can be dissipated from all the heat storage materials M1, M2, and M3. Consequently, the overall amount of heat that the fluid to be discharged through the opening H1 has in a chemical pump can be increased.

In order to stably establish and maintain the above-mentioned state in the head dissipation mode, each of the conversion temperatures of the heat storage materials M1, M2, and M3, which vary depending on the ambient pressure, must be controlled (for example, so as to be kept constant). More specifically, in the heat dissipation mode, the water in the condensers D1, D2, and D3 is deprived of heat caused by phase transition (vaporization) of water to vapor. Therefore the temperatures of water in D1, D2, and D3 decrease, unless controlled. If the temperatures of water in D1, D2, and D3 decrease, the vapor pressure of water decreases, and the ambient pressures around the heat storage materials M1, M2, and M3 in the reactors R1, R2, and R3 decrease accordingly. If the ambient pressures decrease, the conversion temperatures of M1, M2, and M3 each decrease.

In the heat dissipation mode of the first embodiment, in order to control each of the conversion temperatures of the heat storage materials M1, M2, and M3 (for example, so as to be kept constant), a fluid is introduced into the "second fluid passages" provided for D1, D2, and D3 to control the temperatures of water in D1, D2, and D3 (for example, so as to be kept constant).

More specifically, in the heat dissipation mode, the "second fluid passages" are connected to a heating device L, as shown in FIG. 2. In the heating device L, a cooled fluid coming from the first side (C11, C12, C13) of each "second fluid passage" is warmed by using the heat of warm water stored in a warm water tank, and the warmed fluid is introduced to each "second fluid passage" through the second side (C21, C22, C23) thereof with a pump. Thus, the water in each of D1, D2, and D3 is warmed by heat exchange with the fluid flowing in the corresponding "second fluid passage". Thus, the temperatures of water in D1, D2, and D3 are controlled (for example, so as to be kept constant).

In addition, the warm water in the warm water tank is deprived of heat by the fluid flowing in the "second fluid passage". Since the water in the warm water tank is thus cooled, cold water can be taken out of the warm water tank.

In the heat dissipation mode, for example, when the ambient pressures in R1, R2, and R3 are controlled to a constant pressure of, for example, 1 atm by controlling the temperatures of water in D1, D2, and D3, the conversion temperatures of M3, M2, and M1 are kept at 138° C., 227° C., and 484° C., respectively, as shown in FIG. 9. In this instance, when "a state is established where the gas flowing in the first fluid passage from H2 to H1 has temperatures lower than 138° C., 227° C., and 484° C. in the heat exchangers E in R3, R2, and R1, respectively", heat can be dissipated from all the heat storage materials M3, M2, and M1. In this instance, theoretically, the temperature of the gas discharged from the "first fluid passage" through the opening H1 can be raised up to 484° C.

Second Embodiment

A second embodiment of the chemical heat pump according to the present invention will now be described with reference to FIGS. 10 and 11.

Figure 10:
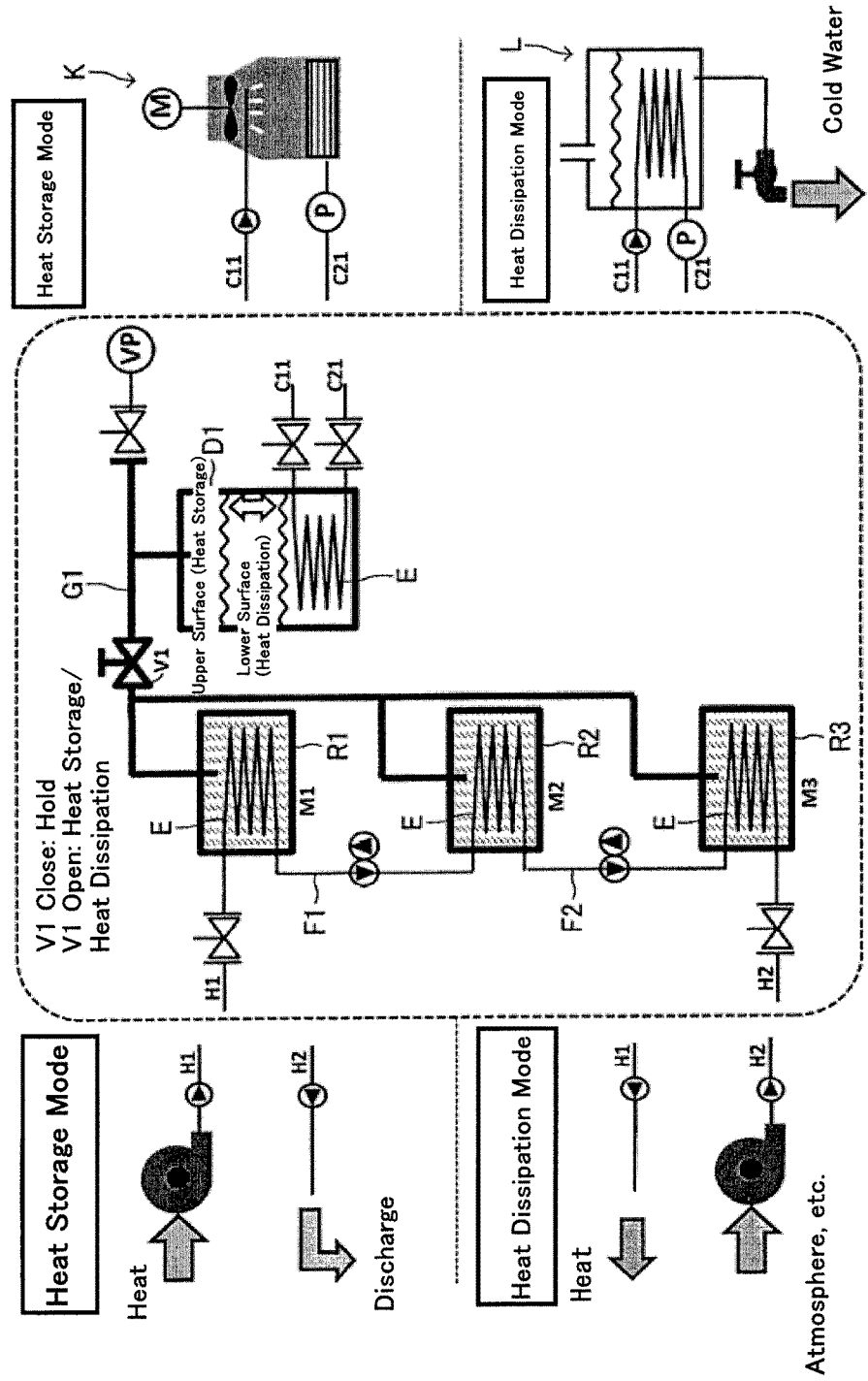
FIG. 10 is a schematic diagram of a chemical heat pump according to a second embodiment of the present invention, corresponding to FIG. 1.
Figure 11:
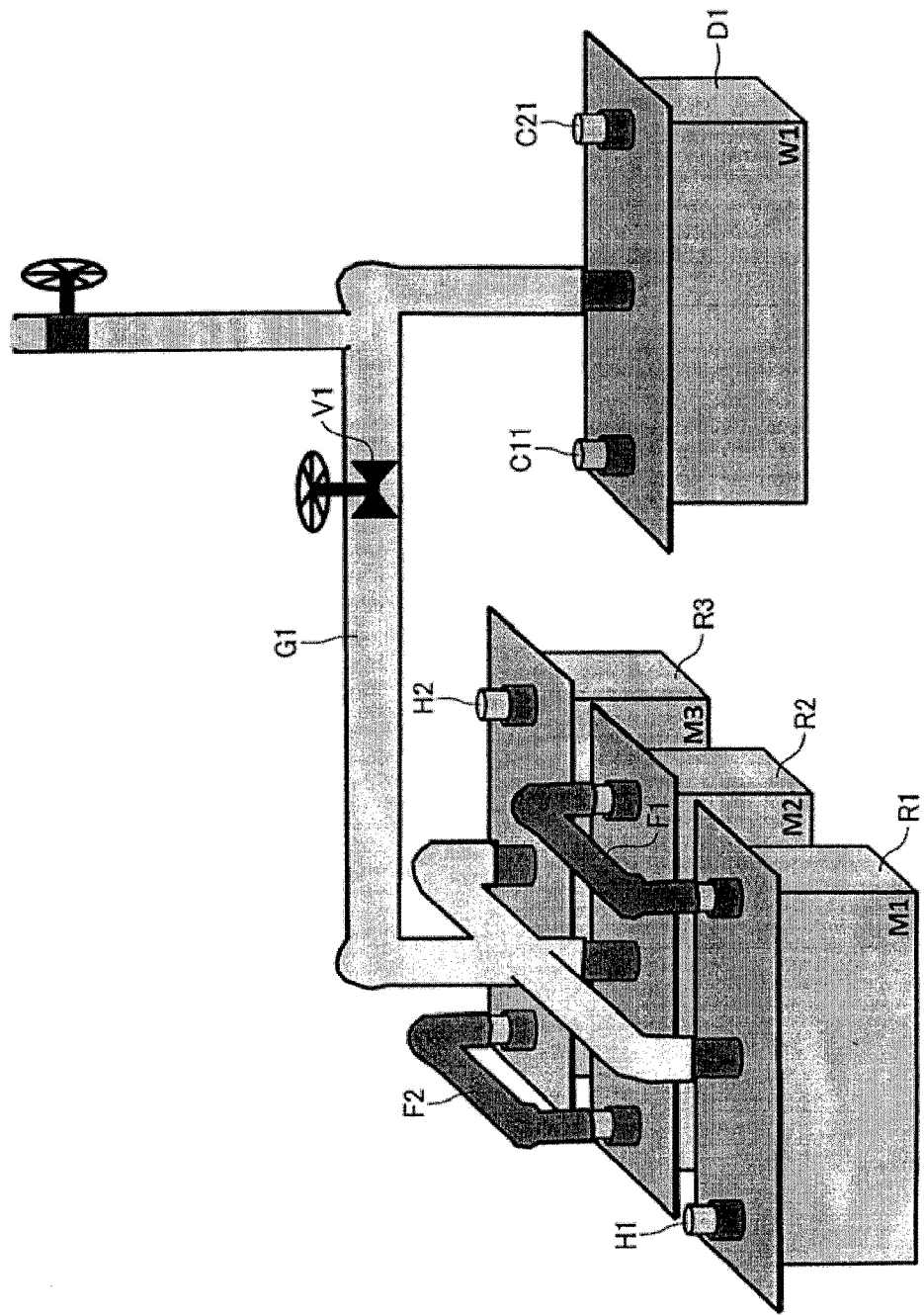
FIG. 11 is a schematic view of the chemical heat pump shown in FIG. 10, corresponding to FIG. 2.

As shown in FIGS. 10 and 11 corresponding to FIGS. 1 and 2, respectively, the second embodiment is different from the first embodiment only in that the "condensing section" is constituted of only a single condenser D1 whereas the "condensing section" in the first embodiment is constituted of independent condensers D1, D2, and D3.

Accordingly, the "connecting section" of the second embodiment is constituted of only a pipe G1. As shown in FIG. 10, the pipe G1 connects D1 to "R1, R2, and R3". More specifically, the pipe B3 protruding from the top of D1 is connected in an air tight manner to each of the "pipes B3 protruding from the tops of R1, R2, and R3", as shown in FIG. 11.

In the second embodiment, R1, R2, and R3 are thus connected to the single D1. Therefore the ambient pressures in R1, R2, and R3 (hence, conversion temperatures of M1, M2, and M3) cannot be independently controlled, unlike the first embodiment. However since the number of condensers and pipes is smaller than in the case of the first embodiment, the structure can be simplified and, accordingly, the manufacturing cost can be reduced.

Third Embodiment

A third embodiment of the chemical heat pump according to the present invention will now be described with reference to FIGS. 12 to 17B.

Figure 12:
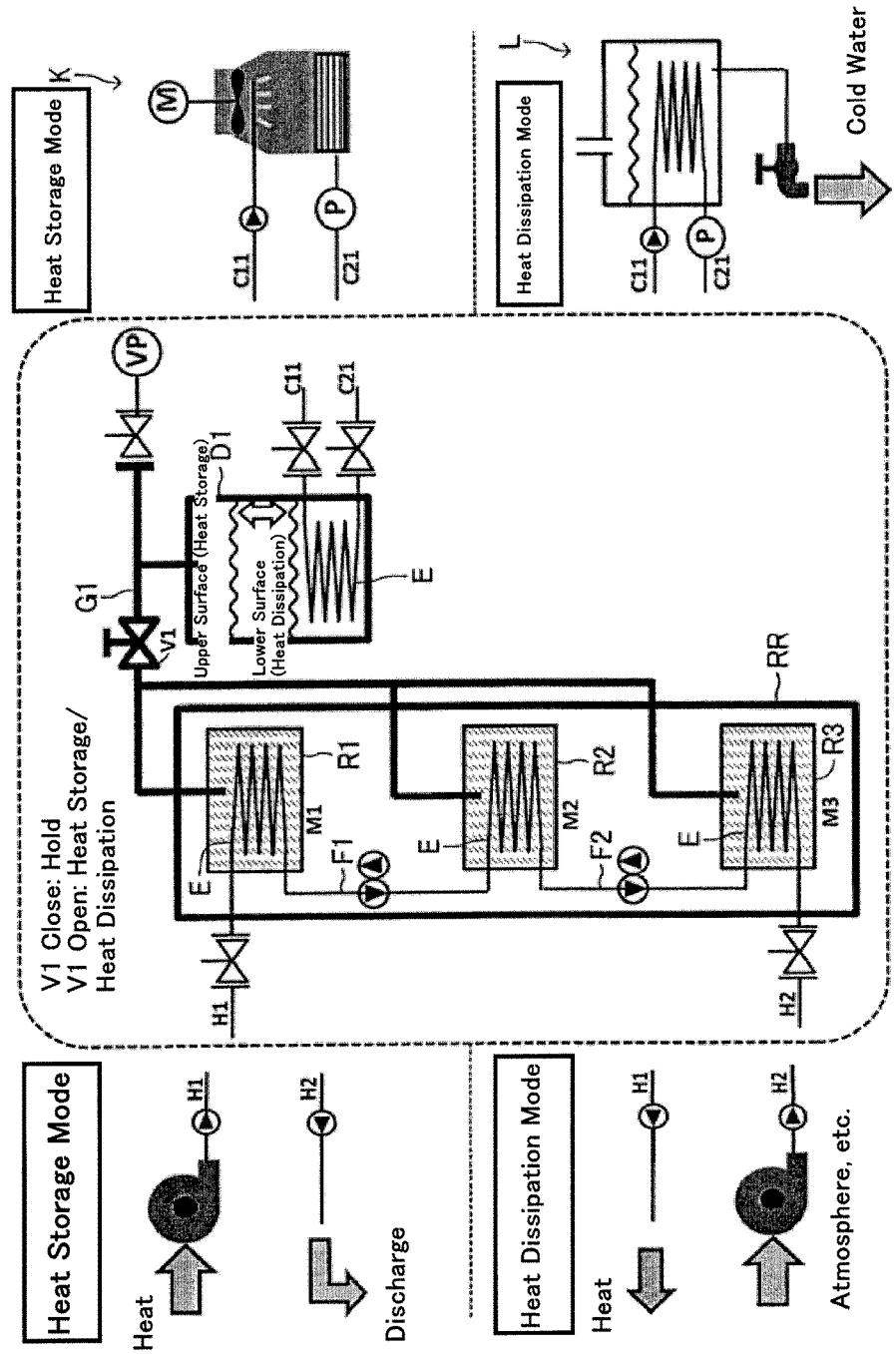
FIG. 12 is a schematic diagram of a chemical heat pump according to a third embodiment of the present invention, corresponding to FIG. 1.
Figure 13:
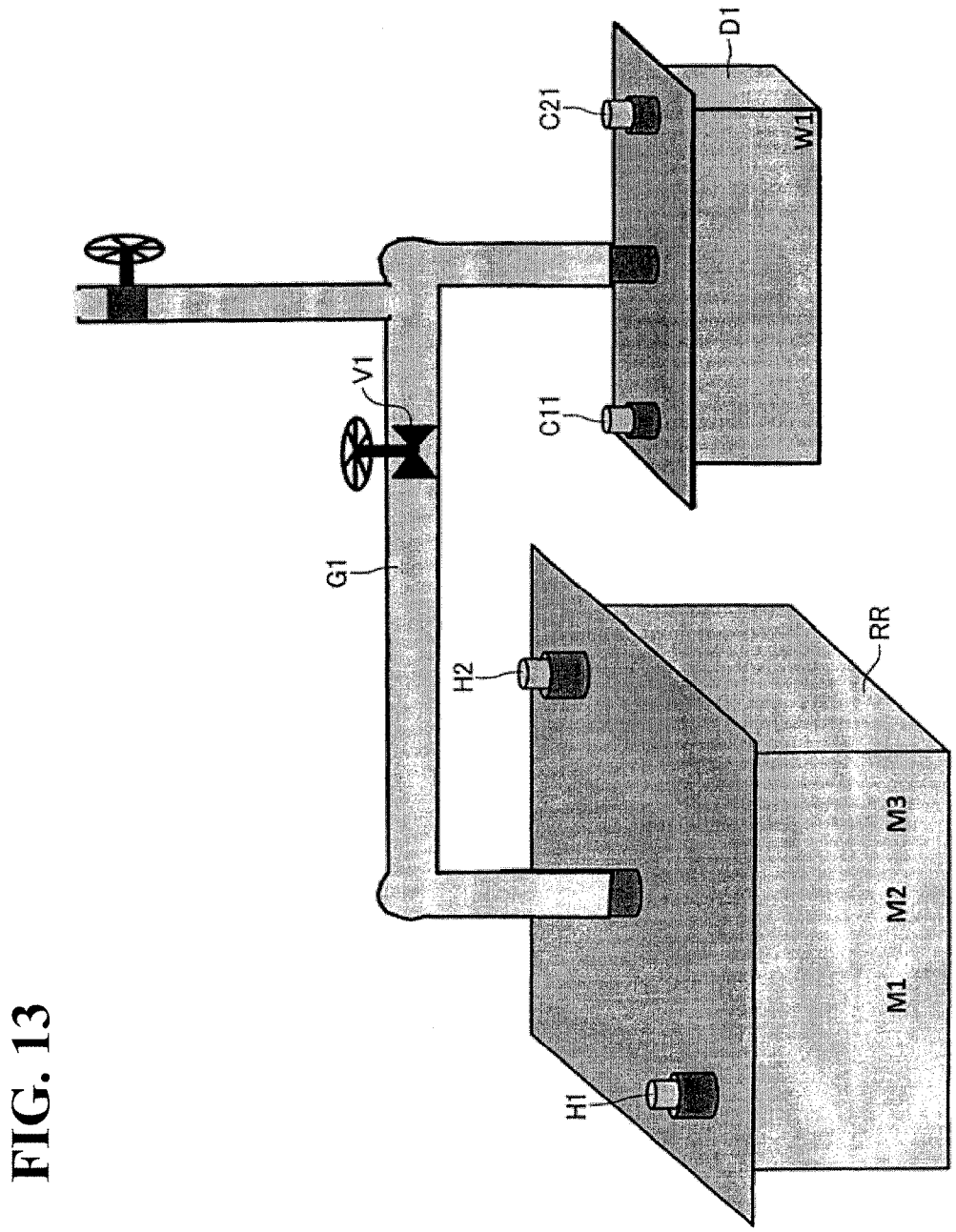
FIG. 13 is a schematic view of the chemical heat pump shown in FIG. 12, corresponding to FIG. 2.
Figure 14A:
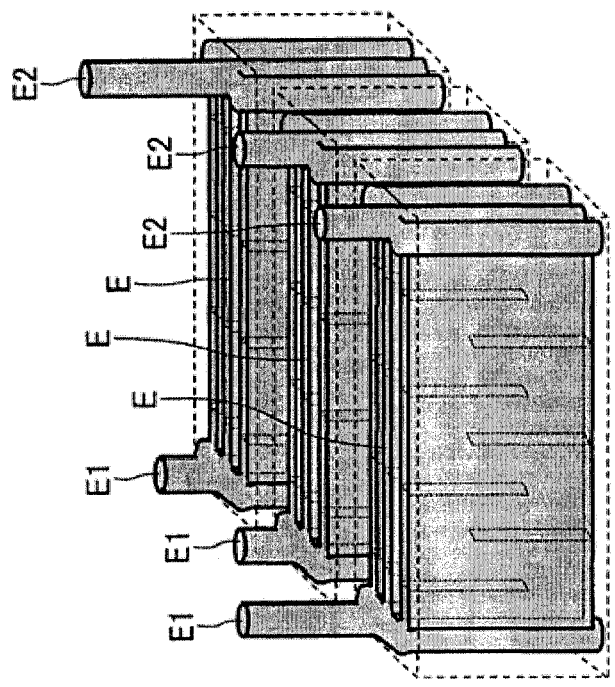
FIGS. 14A and 14B are first representations illustrating a procedure for assembling the chemical heat pump shown in FIG. 13.
Figure 14B:
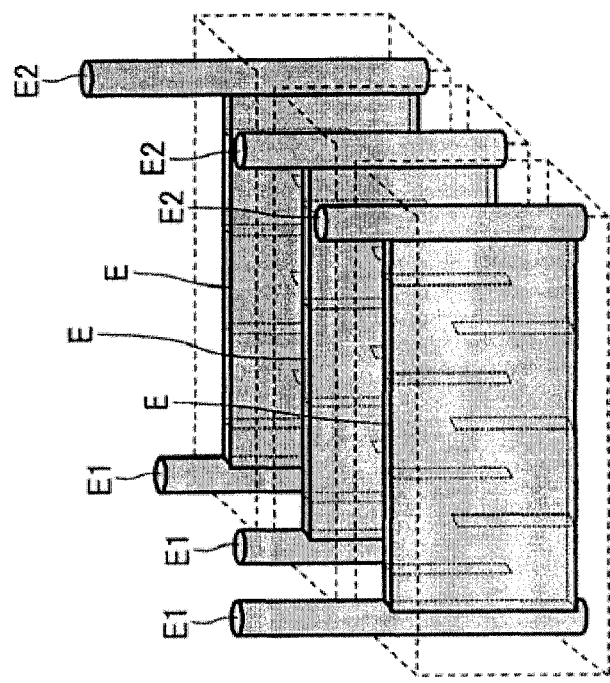
Figures 16A, 16B:
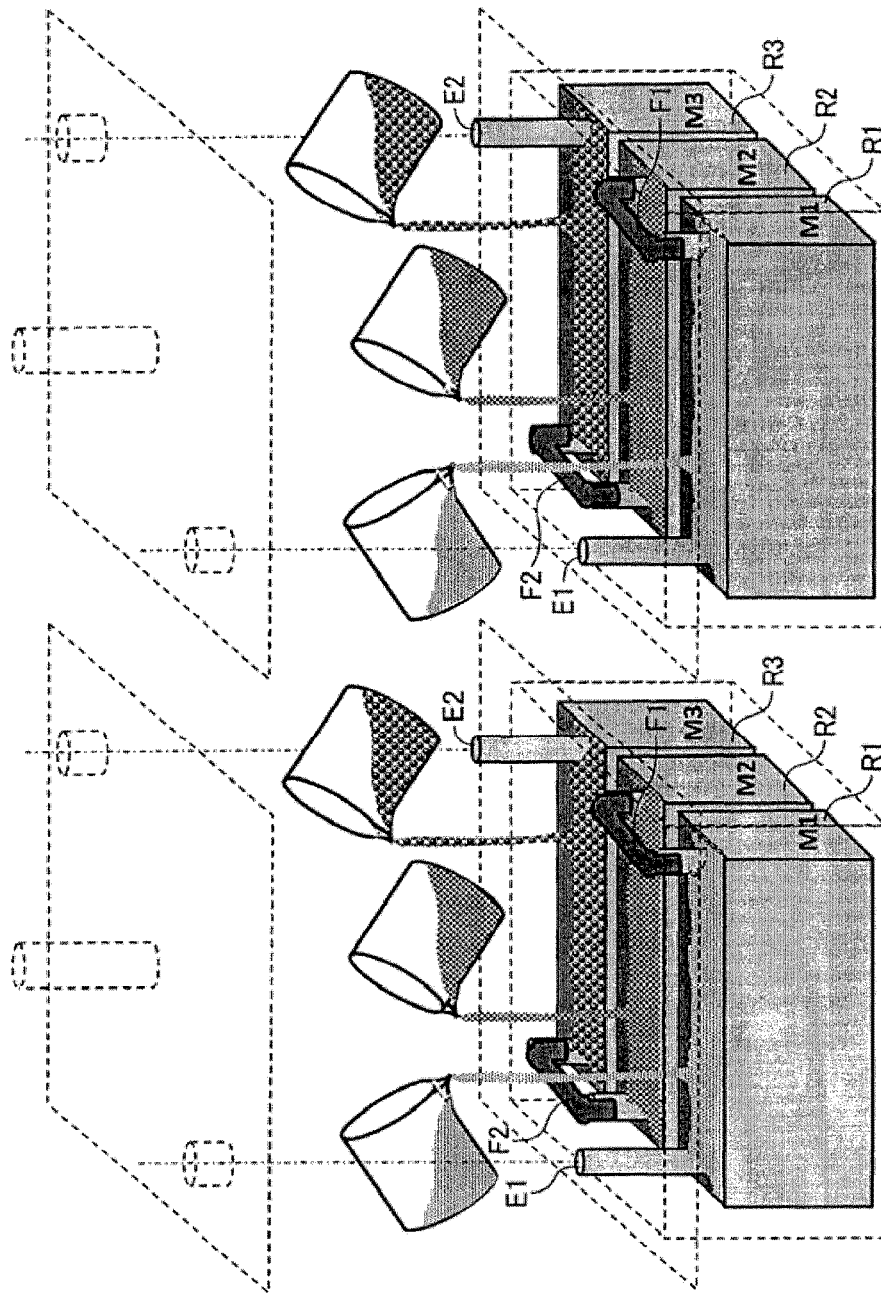
FIGS. 16A and 16B are third representations illustrating the procedure for assembling the chemical heat pump shown in FIG. 13.
Figures 17A, 17B:
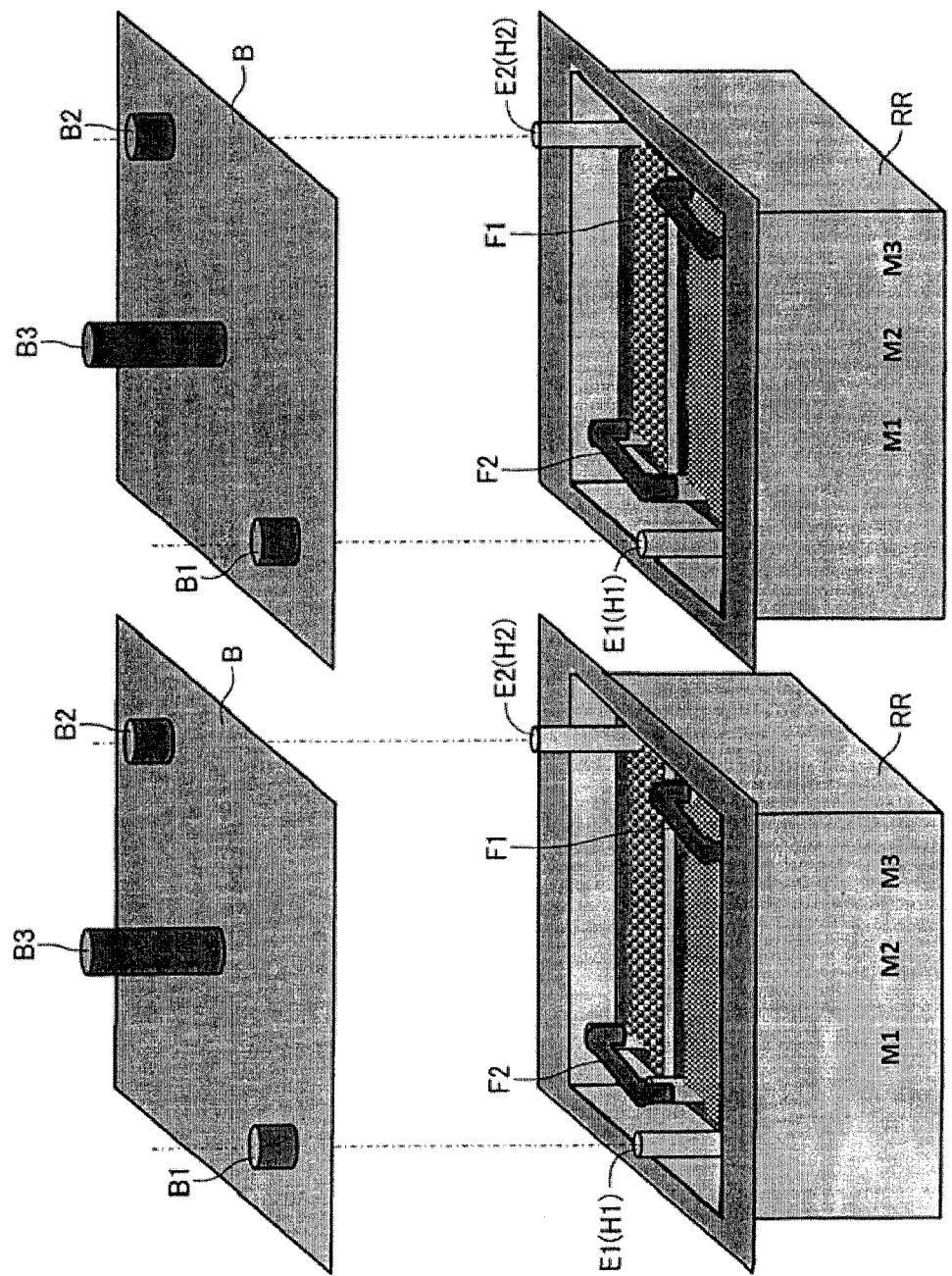
FIGS. 17A and 17B are fourth representations illustrating the procedure for assembling the chemical heat pump shown in FIG. 13.

As can be understood from FIGS. 12 and 13 corresponding to FIGS. 10 and 11, respectively, and FIGS. 14A to 17B illustrating the process for assembling the third embodiment, the third embodiment is the same as the second embodiment in that the "condensing section" is constituted of only a single condenser D1. The third embodiment is, however, different from the second embodiment only in that the reactors R1, R2, and R3 constituting the "reaction section" is enclosed in a single container RR whereas the second embodiment uses reactors R1, R2, and R3 that are independent of each other.

According to this difference, in the third embodiment, tops of R1, R2, and R3 in the container RR are open, as shown particularly in FIGS. 16A, 16B, 17A and 17B. Hence, R1, R2, and R3 are not covered with the independent lids B. Instead, a single large lid B is joined to the top of the container RR so as to cover the entity of the top of the container RR in an air tight manner. Then, the pipe B3 protruding from the top of D1 is connected in an air tight manner to the pipe B3 protruding from the top of RR with the pipe G1 therebetween, as shown in FIG. 13.

As is clear from the comparison between FIGS. 11 and 13, in the third embodiment, the number of pipes exposed at the top of portions corresponding to the "reaction section" is smaller than that in the second embodiment. Accordingly, the appearance is better than that in the second embodiment.

Fourth Embodiment

A fourth embodiment of the chemical heat pump according to the present invention will now be described with reference to FIGS. 18 to 22.

Figure 18:
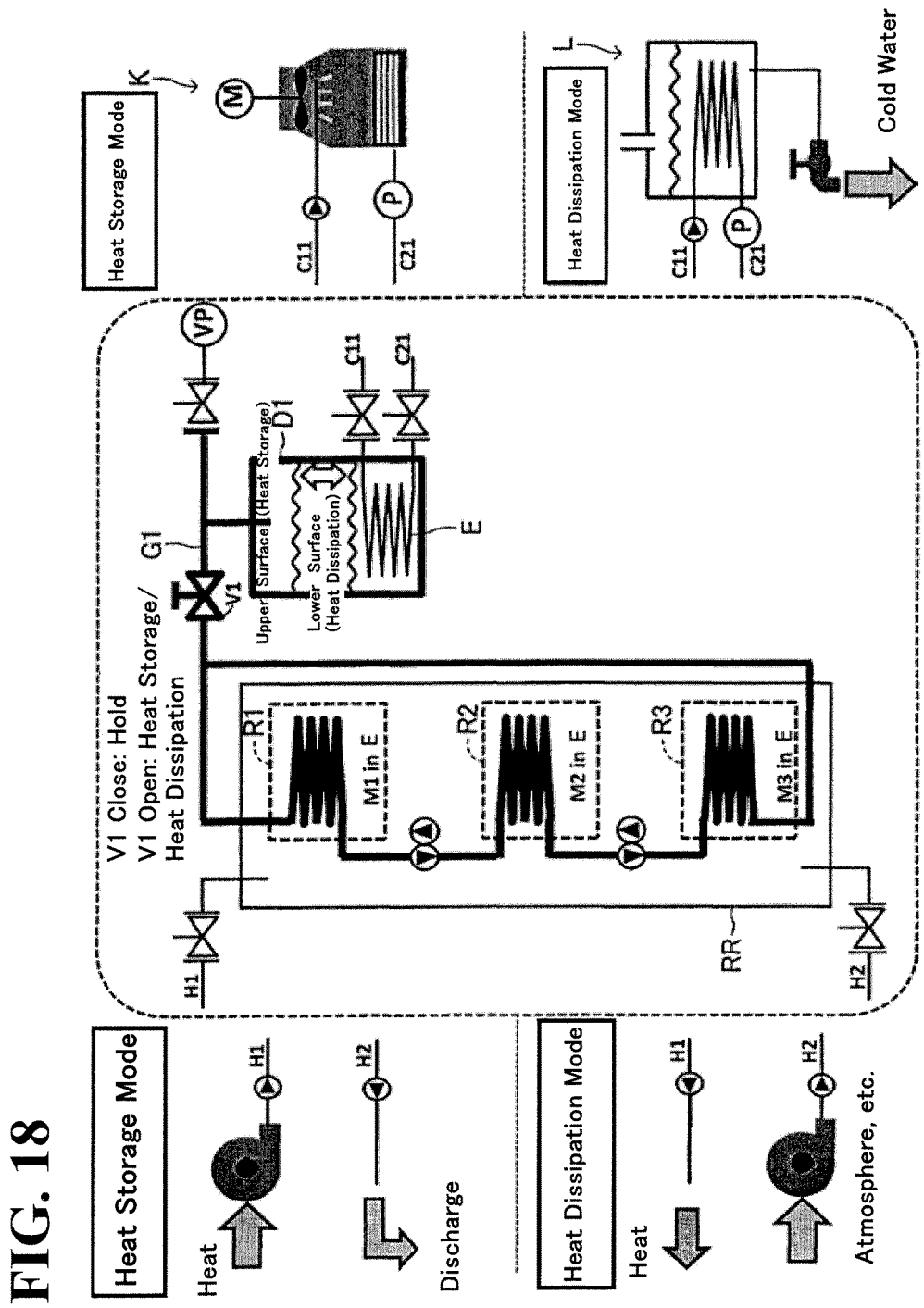
FIG. 18 is a schematic diagram of a chemical heat pump according to a fourth embodiment of the present invention, corresponding to FIG. 1.
Figure 19:
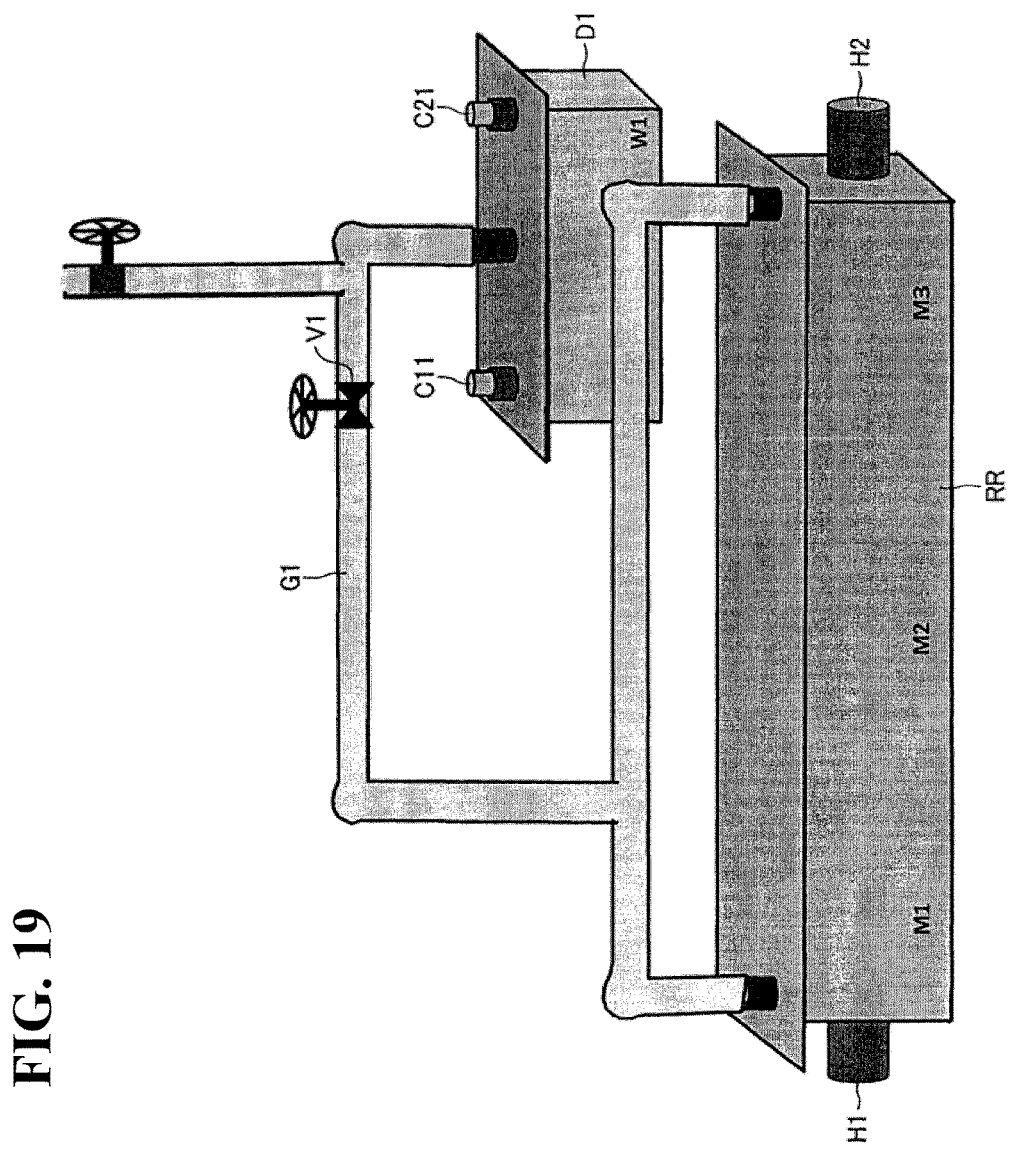
FIG. 19 is a schematic view of the chemical heat pump shown in FIG. 18, corresponding to FIG. 2.
Figure 20:
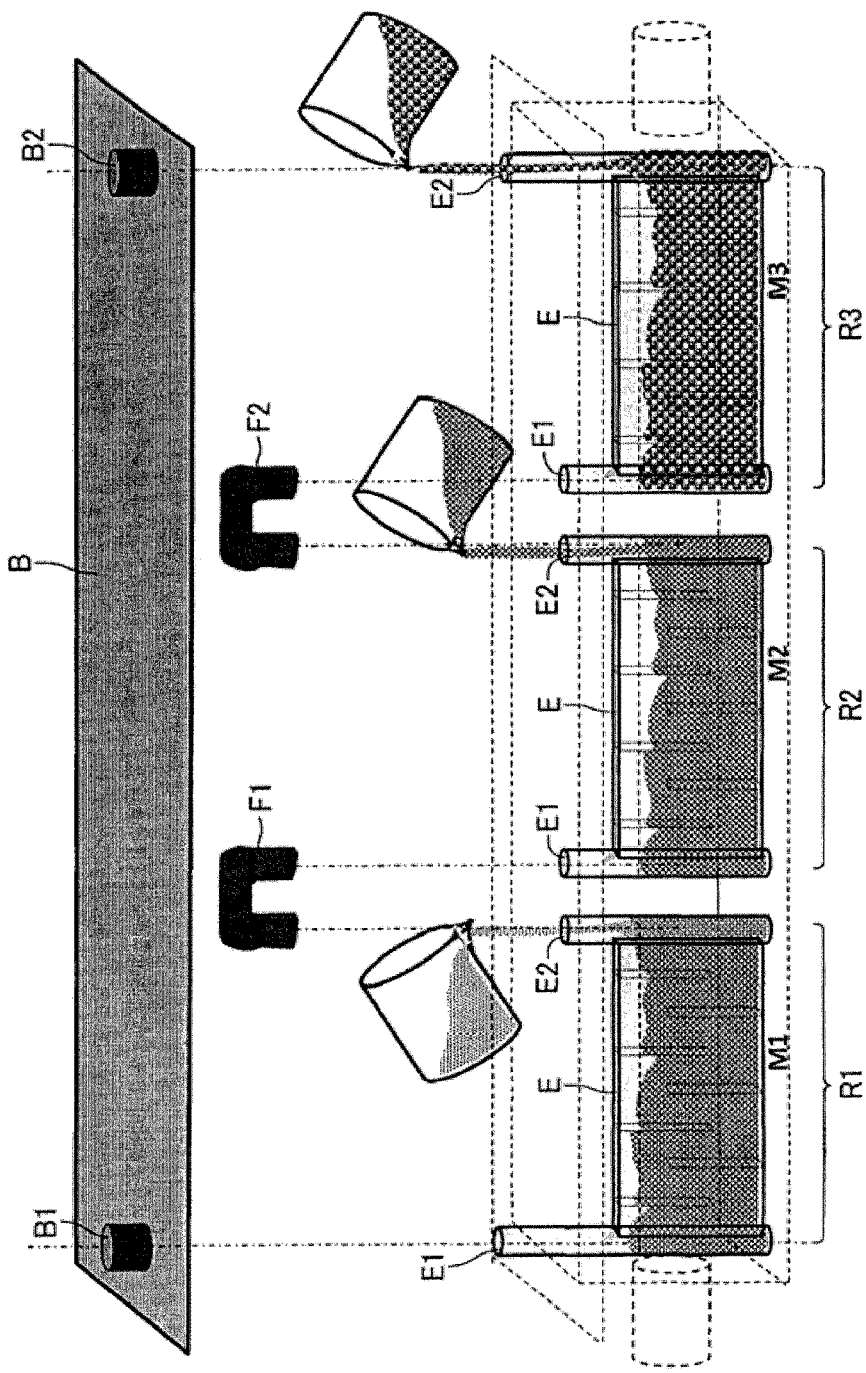
FIG. 20 is a first representation illustrating a procedure for assembling the chemical heat pump shown in FIG. 19.
Figure 21:
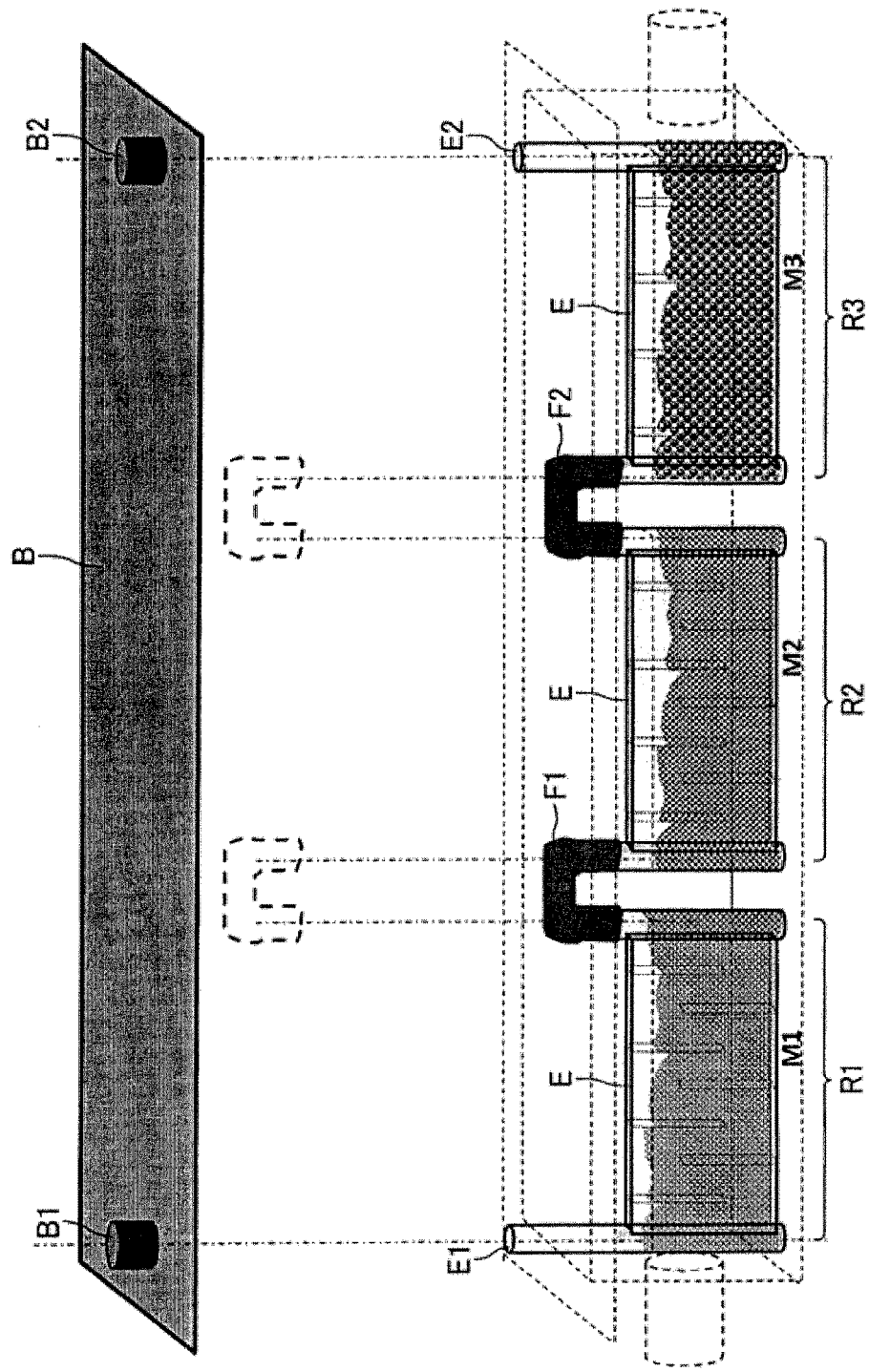
FIG. 21 is a second representation illustrating the procedure for assembling the chemical heat pump shown in FIG. 19.
Figure 22:
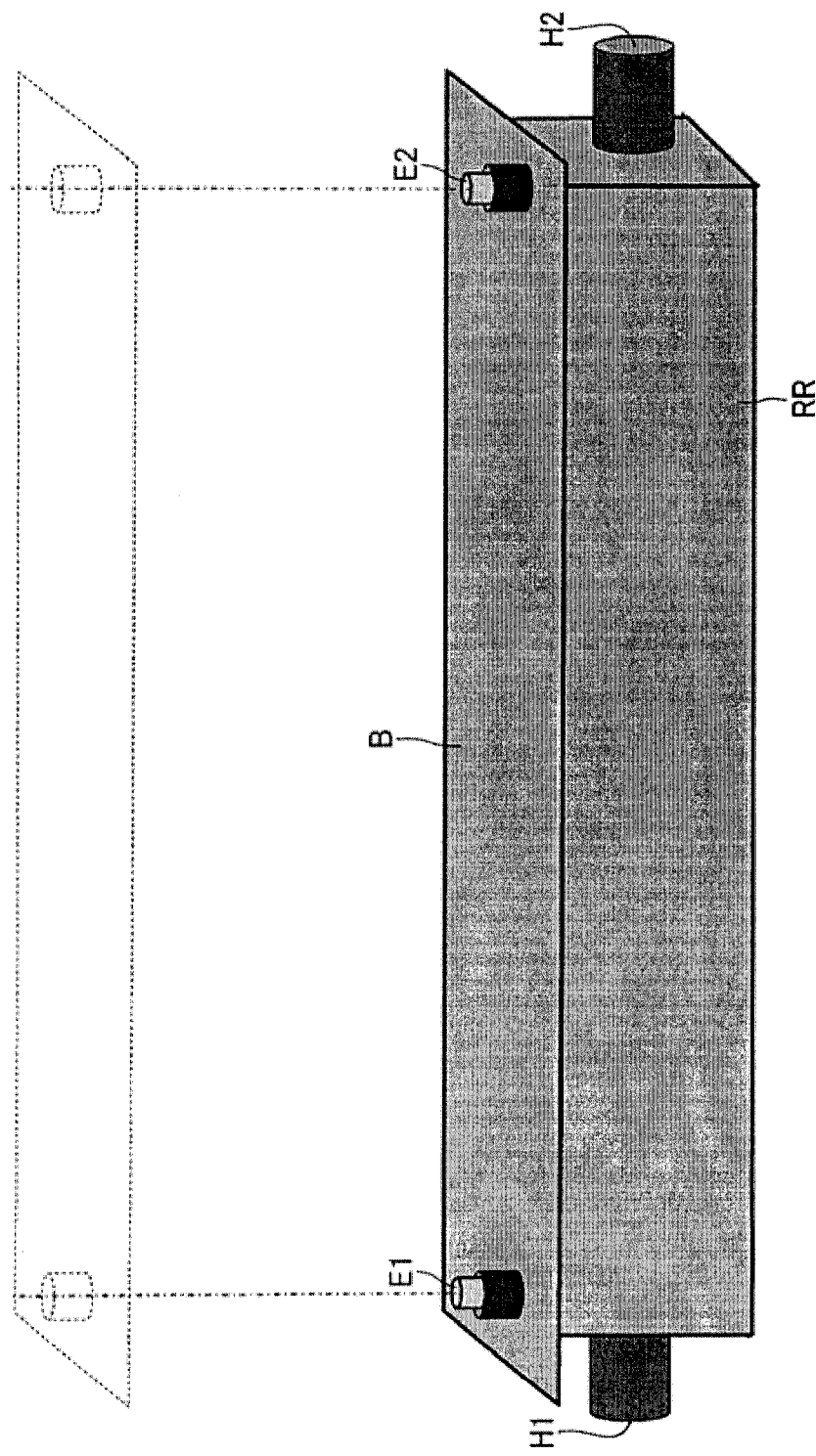
FIG. 22 is a third representation illustrating the procedure for assembling the chemical heat pump shown in FIG. 19.

As can be understood from FIGS. 18 and 19 corresponding to FIGS. 12 and 13 respectively, and FIGS. 20 to 22 illustrating the process for assembling the fourth embodiment, the fourth embodiment is different from the third embodiment in that "three heat exchangers E connected in series" contained in a container RR are used as reactors R1, R2, and R3 whereas the heat exchangers E in the reactors R1, R2, and R3 of the third embodiment are each used as a portion of the "first fluid passage".

According to this difference, in the fourth embodiment, the internal spaces of the three heat exchangers used as reactors R1, R2, and R3 in the container RR are filled with heat storage materials M1, M2, and M3, respectively, as shown in FIGS. 20 and 21. In this state, a single large lid B is joined to the top of the container RR so as to cover the entirety of the open top of the container RR in an air tight manner. Then, "the opening E1 of the heat exchanger E corresponding to R1" protruding from the top of RR, "the opening E2 of the heat exchanger E corresponding to R3" protruding from the top of RR, and the pipe B3 protruding from the top of D1 are connected one another in an air tight manner with the pipe G1, as shown in FIGS. 19 and 22.

The internal space of the container RR except the regions for the three heat exchangers E is used as a "first fluid flow channel". In other words, in the fourth embodiment, "a portion close to the reactor R1 in the internal space of the container RR" communicates with "the opening H1 provided for RR", and "a portion close to the reactor R3 in the internal space of the container RR" communicates with "the opening H2 provided for RR". In this structure, the "first fluid passage" is a continuous flow channel formed by connecting a member defining the opening H1, "the internal space of the container RR except the regions for the three heat exchangers E", and a member defining the opening H2 in this order. The "first side" of the "first fluid passage"

corresponds to the opening H1, and the "second side" of the "first fluid passage" corresponds to the opening H2.

The present invention is not limited to the disclosed embodiments and various modifications may be made within the scope of the invention. For example, the "plurality of heat storage materials" may be defined by two heat storage materials having different conversion temperatures, or four or more heat storage materials having different conversion temperatures, while the above embodiments each use three heat storage materials having different conversion temperatures.

Also, the "first fluid passage" may be defined by a plurality of passages continuously connected in parallel, while the "first fluid passage" in the above embodiments is defined by a continuous single passage.

Furthermore, while the above embodiments use CaO, MgO, and $CaSO_4$ as the three heat storage materials M1, M2, and M3 having different conversion temperatures, respectively, $CaCl_2$ may be used as M3, instead of $CaSO_4$. The use of $CaCl_2$ can produce the same effects as in the above embodiments.

$CaCl_2$ has the first property (=the "property of dissipating heat while being converted into a hydrate by exothermic reaction with water vapor") and the second property (=the "property of storing heat while releasing water vapor and thus being dehydrated by an endothermic reaction of the hydrate caused by receiving external heat".

$CaCl_2$ is involved in the following reactions expressed by the following formulas (4): In the formulas (4), "Q" represents thermal energy, and "n" represents a natural number. In formulas (4), $CaCl_2 \cdot nH_2O$ is a hydrate of $CaCl_2$.

$CaCl_2 \cdot nH_2O + Q \rightarrow CaCl_2 + nH_2O$ (Endothermic reaction)

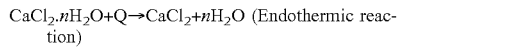
$CaCl_2 \cdot nH_2O + Q \ominus CaCl_2 + nH_2O$ (Exothermic reaction)    (4)

Even if CaO, MgO, and $CaCl_2$ are used as heat storage materials M1, M2, and M3, it holds true that "the conversion temperature of CaO (=M1) is higher than the conversion temperature of MgO (=M2) that is higher than the conversion temperature of $CaCl_2$ (=M3)" (at the same ambient pressure).

Heat storage materials having the "property of dissipating heat while being converted into a carbonated compound by an exothermic reaction with carbon dioxide" (third property) and the "property of storing heat while releasing carbon dioxide to be decarbonated by an endothermic reaction of the carbonated compound produced by receiving external heat" (fourth property) may be used as the plurality of heat storage materials having different transition temperatures, while the above embodiments use heat storage materials having the first property and the second property.

Heat storage materials M1 and M2 having different conversion temperatures and having the third and the fourth property may be CaO and PbO. The term "conversion temperature" in this case is defined as a temperature corresponding to the critical point at which the "heat storage material itself (=decarbonated material)" and the "carbonated compound of the heat storage material" are converted into each other.

CaO and PbO are involved in the reactions expressed by the following formulas (5) and (6), respectively. In the formulas, "Q" represents thermal energy. In formulas (5), $CaCO_3$ is a carbonated compound of CaO; in formulas (6), $PbCO_3$ is a carbonated compound of PbO.

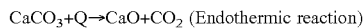
$CaCO_3 + Q \rightarrow CaO + CO_2$ (Endothermic reaction)

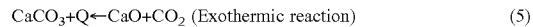
$CaCO_3 + Q \leftarrow CaO + CO_2$ (Exothermic reaction)    (5)

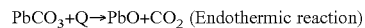
$PbCO_3 + Q \rightarrow PbO + CO_2$ (Endothermic reaction)

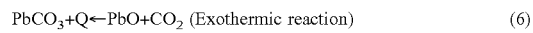
$PbCO_3 + Q \leftarrow PbO + CO_2$ (Exothermic reaction)    (6)

When CaO and PbO are used as heat storage materials M1 and M2, it holds true that "the conversion temperature of CaO (=M1) is higher than the conversion temperature of PbO (=M2) (at the same ambient pressure).

Thus, even when CaO and PbO are used as heat storage materials M1 and M2 (M3 is omitted) while "carbon dioxide" is used instead of water vapor in the condensing section, the same effects as in the above embodiments can be produced.

(Heat Storage Material Container)

The heat storage material container will now be described with reference to FIGS. 23 to 25.

In the first to third embodiments, the reactor is charged with the powder of a heat storage material by introducing the powder of the heat storage material itself into the reactor, as shown in FIGS. 5, 16A, 16B, and 20. Thus, the reactor is filled with an aggregate of closely packed powder particles of the heat storage material.

In the heat dissipation mode in the first to third embodiments, water vapor enters the reactor through the pipe of the upper lid of the reactor. Therefore the water vapor can easily reach the portion of the aggregate of the powder close to the upper lid of the reactor. Consequently, the above-described exothermic reaction (see formulas (1) to (3)) more easily occurs in the portion of the powder close to the upper lid.

In order for water vapor to reach the portion of the aggregate of the powder distant from the upper lid of the reactor (portion near the bottom of the reactor), the water vapor must move to the lower side so as to penetrate spaces among particles of the closely packed powder in a meandering manner. Therefore water vapor cannot easily reach the portion distant from the upper lid. Thus, the exothermic reaction is unlikely to occur in the portion of the powder distant from the upper lid.

If the reactor is filled with an aggregate of closely packed powder particles of a heat storage material, the aggregate is likely to have a portion in which exothermic reaction does not easily occur, as described above. This implies that there is room for further increasing the exothermic reaction speed of the heat storage material as a whole (amount per unit time of the heat storage material that can react with water vapor).

Similarly, in the heat storage mode in the first to third embodiments, water vapor generated from the portion of the powder located close to the upper lid of the reactor by the endothermic reaction (see formulas (1) to (3)) easily flows to the connecting section through the top of the reactor. In order for water vapor generated from the portion of the powder located distant from the upper lid of the reactor to flow to the top of the reactor, the water vapor must move to the upper side so as to penetrate spaces among particles of the closely packed powder in a meandering manner. Thus, the water vapor does not easily flow and is likely to be saturated accordingly. Consequently, endothermic reaction is unlikely to occur in the portion of the powder located distant from the upper lid of the reactor.

If the reactor is filled with an aggregate of closely packed powder particles of a heat storage material, the aggregate is likely to have a portion in which endothermic reaction does not easily occur, as described above. This implies that there is room for further increasing the endothermic reaction speed of the heat storage material as a whole (amount per unit time of the heat storage material from which vapor is released).

If the exothermic reaction speed and the endothermic reaction speed are increased, the efficiency of heat exchange between the fluid flowing in the "first fluid passage" and the heat storage material is increased, and the energy efficiency of the chemical heat pump is increased as a whole, accordingly.

Figure 23:
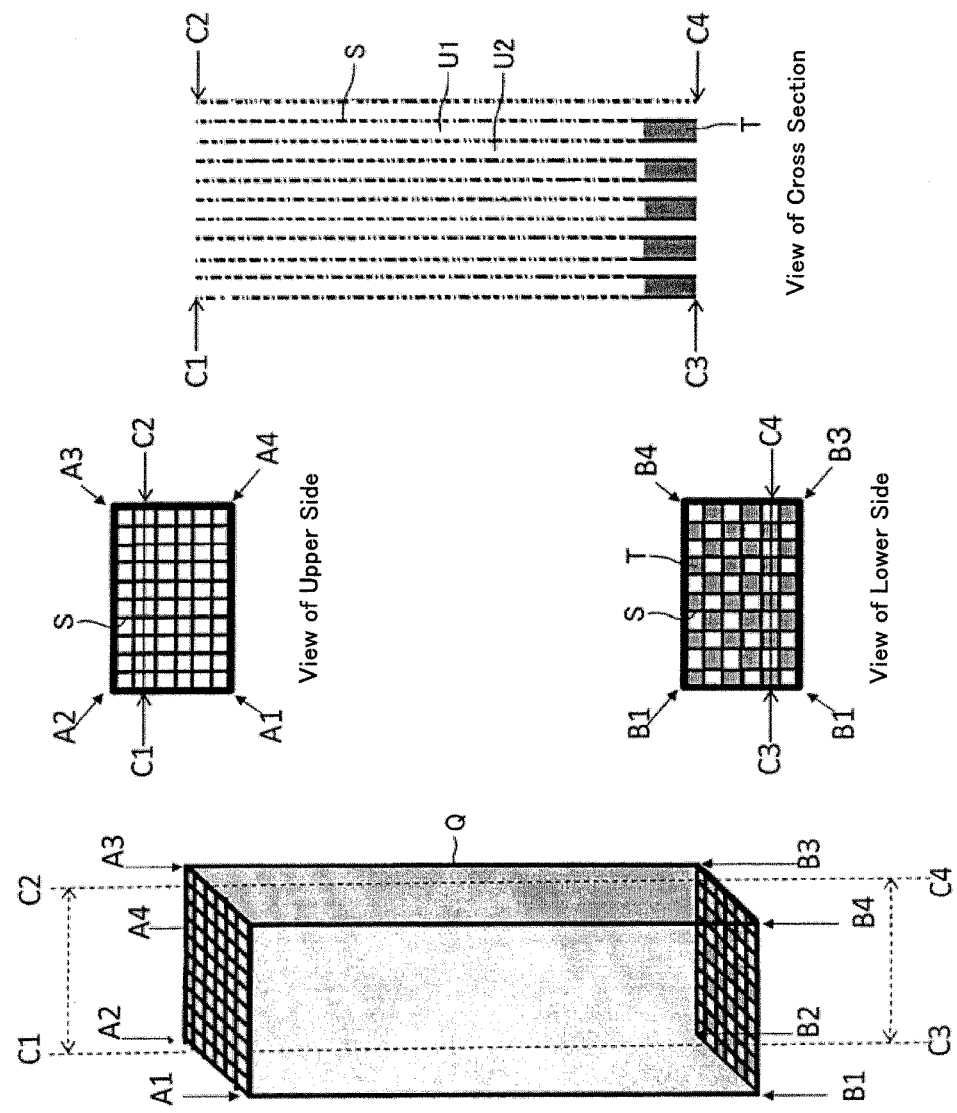
FIG. 23 is a schematic representation illustrating the entire structure of a heat storage material container.

The "heat storage material container" shown in FIG. 23 is intended to address this issue. As shown in FIG. 23, the container has a main body having a longitudinal direction (=vertical direction). The main body includes a frame Q extending in the longitudinal direction having inner holes passing in the longitudinal direction therein, and partition walls S separating the inner holes from each other so as to define "a plurality of flow channels extending parallel to each other in the longitudinal direction".

In the embodiment shown in FIG. 23, the frame Q has a rectangular section, and the partition walls S are arranged so as to divide the rectangular section into a plurality of segments in a matrix manner. The partition walls S are made of a porous material.

In the embodiment shown in FIG. 23, "first flow channels U1 each having an upper open end and a lower end closed with a stop member T in the longitudinal direction thereof" and "second flow channels U2 each having an upper open end and a lower open end in the longitudinal direction thereof" are formed as the "plurality of flow channels" separated by the partition walls S, so as to be alternately arranged at the section of the frame Q in a matrix manner.

Figure 24:
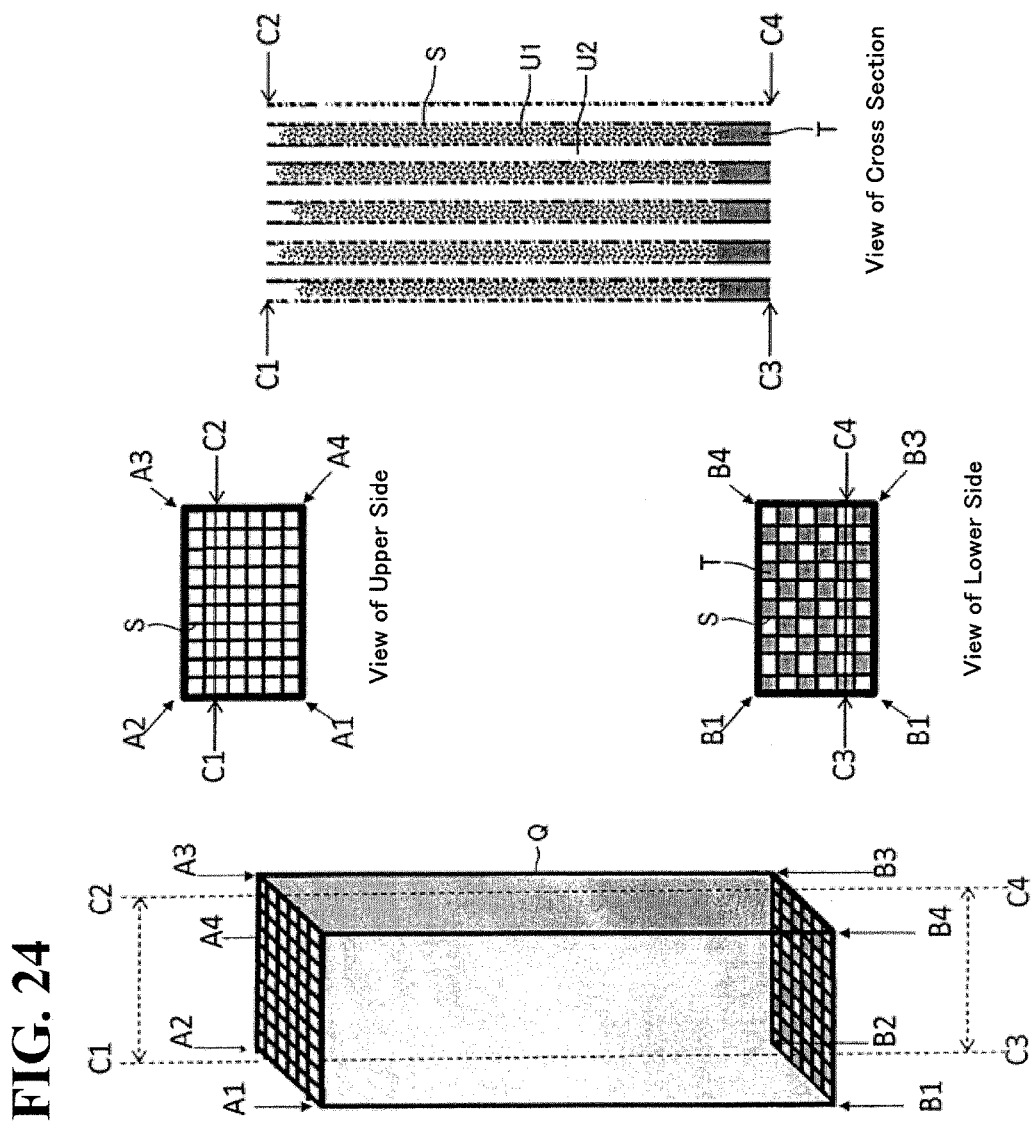
FIG. 24 is a schematic representation illustrating a state where the container shown in FIG. 23 contains a heat storage material.

In the container shown in FIG. 23, the plurality of first flow channels U1 are charged with a heat storage material (M1, M2, or M3) while the plurality of second flow channels U2 are not charged with the heat storage material (M1, M2, or M3), as shown in FIG. 24. For establishing this state, the powder of the heat storage material can be introduced into the container shown in FIG. 23 from the top of the container so as to raise the level of the powder. Both the upper ends of the first flow channels U1 and the second flow channels U2 are open. Therefore the introduced powder runs down through both the first and the second flow channels U1 and U2 by force of gravity. The lower end of U1 is closed, while the lower end of U2 is open. Therefore the heat storage material introduced into U1 is held in U1 and fills U1, whereas the heat storage material introduced into U2 falls out of U2 through the lower end of U2. Hence, the "state where only the plurality of U1 are filled with the powder of the heat storage material while the plurality of U2 are not filled with the heat storage material" is achieved, as shown in FIG. 24.

A plurality of such containers, in which only the plurality of U1 are filled with a heat storage material, are thus prepared. These containers are substituted for the powders of the heat storage materials shown in FIGS. 5, 16A, 16B and 20 and arranged in the reactor (more specifically, in the internal space of the reactor except the regions for the heat exchangers).

Figures 25A, 25B:
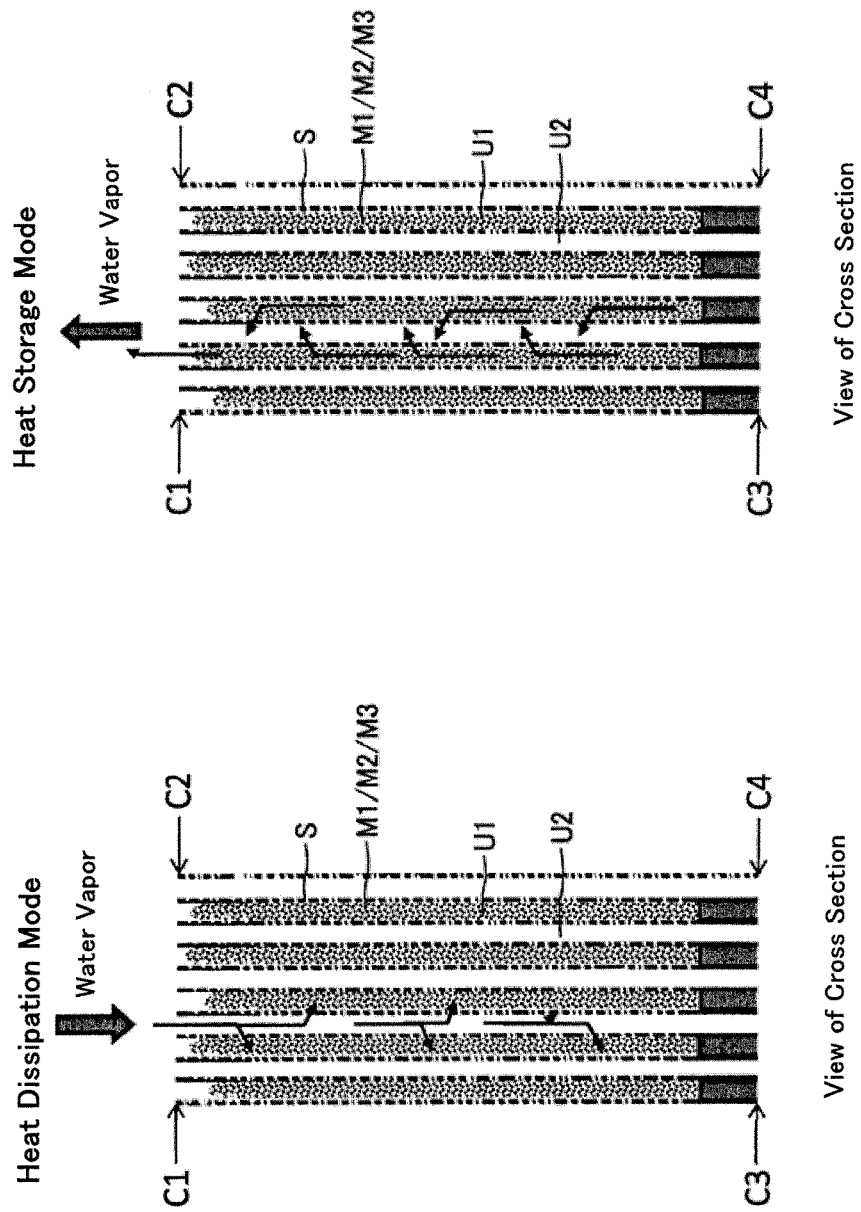
FIGS. 25A and 25B are schematic representations illustrating paths in the container shown in FIG. 23 through which water vapor flows.

Consequently, when water vapor is introduced into the reactor through the top of the reactor in the heat dissipation mode, the water vapor enters the containers through the top of the containers in the longitudinal direction, as shown in FIG. 25A. Since both the upper ends of the first flow channels U1 and the upper ends the second flow channels U2 are open, water vapor attempts to enter both the second flow channels U1 and U2. Since U1 is filled with the heat storage material, however, the water vapor does not easily flow into U1. Consequently, a large portion of the water vapor enters U2 not filled with the heat storage material.

The water vapor that has entered U2 flows from the upper side toward the lower side in U2, thus flowing through the whole of U2 from the upper side to the lower side. In this state, the water vapor in U2 can flow to U1 through pores in any portion in the longitudinal direction (=vertical direction) of the porous portion S, as shown in FIG. 25A. Thus, the water vapor can reach the aggregate of the powder of the heat storage material in U1 substantially uniformly in the longitudinal direction (=vertical direction). In other words, the aggregate is unlikely to have a portion which water vapor cannot easily reach. This suggests that the aggregate is unlikely to have a portion in which the exothermic reaction does not easily occur.

Similarly, in the heat storage mode, the water vapor generated from the powder of the heat storage material in U1 by the endothermic reaction can easily flow to U2 through pores in any portion in the longitudinal direction (=vertical direction) of the porous partition wall S. The water vapor that has reached U2 easily enters U2 through the upper end of U2 and flows to the connecting section through the top of the reactor. This suggests that the aggregate is unlikely to have a portion in which the endothermic reaction does not easily occur.

Thus, an arrangement of a plurality of "containers charged with the heat storage material" shown in FIG. 24 within a reactor is expected to increase the reaction speeds of the exothermic reaction and the endothermic reaction. Accordingly, it is expected that the efficiency of heat exchange between the fluid flowing in the "first fluid passage" and the heat storage material will be increased, and that the energy efficiency of the chemical heat pump will be increased as a whole.

Preferably, the partition walls S are made of the same material as "the heat storage material in the container". Consequently, the amount of the heat storage material present in the reactor is increased, and accordingly the overall amount of reaction involved in the heat exchange in the chemical heat pump is increased compared to the case of using other materials.

The material of the partition walls S is preferably SiC or C. SiC and C are materials having a relatively high thermal conductivity. Therefore the thermal efficiency of the heat exchange between the fluid flowing in the "first fluid passage" and the heat storage material can be increased.

In the embodiment shown in FIG. 23, the first flow channels U1 and the second flow channels U2 are disposed so as to be alternately arranged in a matrix manner at the section of the frame Q. However the arrangement of the flow channels is not necessarily in an alternate manner as long as at least one second flow channel U2 is present.

The present application claims priority from Japanese Patent Application No. 2014-227754, filed on Nov. 10, 2014, the entire contents of which are incorporated herein by reference.

What is claimed is:

1. A heat storage material container comprising:
a main body having a longitudinal direction and including a plurality of flow channels therein, the flow channels extending parallel to each other in the longitudinal direction and separated from each other by porous walls, the plurality of flow channels include a plurality of first flow channels each having an open end on a first side in the longitudinal direction and a closed end on a second side in the longitudinal direction, and a plurality of second flow channels each having open ends on both the first side and the second side in the longitudinal direction; and a heat storage material contained in only the first flow channels without being contained in the second flow channels, the heat storage material comprises at least two materials, each material having a conversion temperature corresponding to a critical point at which the material and a hydrate of the material are converted into each other at an ambient pressure, such that the conversion temperature of one of the materials is higher than the conversion temperature of another of the materials, at the same ambient pressure.

2. The container according to claim 1, wherein the first flow channels and the second flow channels are alternately arranged when viewed in the longitudinal direction.

3. The container according to claim 1, wherein the porous walls are made of SiC or C.

* * * * *